(12) United States Patent
Schulz

(10) Patent No.: US 7,534,096 B2
(45) Date of Patent: May 19, 2009

(54) METHOD AND SYSTEM FOR IMPROVING PUMP EFFICIENCY AND PRODUCTIVITY UNDER POWER DISTURBANCE CONDITIONS

(75) Inventor: Harry W. Schulz, Racine, WI (US)

(73) Assignee: Unico, Inc., Franksville, WI (US)

( * ) Notice: Subject to any disclaimer, the term of this patent is extended or adjusted under 35 U.S.C. 154(b) by 566 days.

(21) Appl. No.: 11/155,372

(22) Filed: Jun. 17, 2005

(65) Prior Publication Data
US 2005/0281680 A1    Dec. 22, 2005

Related U.S. Application Data

(60) Provisional application No. 60/581,282, filed on Jun. 18, 2004, provisional application No. 60/668,016, filed on Apr. 4, 2005, provisional application No. 60/668,316, filed on Apr. 5, 2005, provisional application No. 60/670,401, filed on Apr. 12, 2005.

(51) Int. Cl.
*F04B 49/06* (2006.01)

(52) U.S. Cl. ........... 417/45; 417/44.11

(58) Field of Classification Search ........... 417/44.11, 417/1–47, 53; 318/805
See application file for complete search history.

(56) References Cited

U.S. PATENT DOCUMENTS

| | | | |
|---|---|---|---|
| 3,593,103 A | | 7/1971 | Chandler et al. |
| 3,950,684 A | * | 4/1976 | Peterson ............... 388/806 |
| 4,264,846 A | * | 4/1981 | Sauer et al. ............ 318/249 |
| 5,479,081 A | * | 12/1995 | Seibel et al. ........... 318/805 |
| 6,057,622 A | * | 5/2000 | Hsu ....................... 310/191 |
| 6,127,764 A | * | 10/2000 | Torok ..................... 310/269 |
| 6,313,600 B1 | | 11/2001 | Hammond et al. |
| 6,686,718 B2 | | 2/2004 | Jadric et al. |
| 7,199,497 B2 | * | 4/2007 | Tessier et al. ............ 310/90 |
| 7,330,779 B2 | | 2/2008 | Schulz |

* cited by examiner

*Primary Examiner*—Devon C Kramer
*Assistant Examiner*—Dnyanesh Kasture
(74) *Attorney, Agent, or Firm*—Reinhart Boerner Van Deuren P.C.

(57) ABSTRACT

A system for controlling operation of a progressing cavity pump to maintain the motor operating under power disturbance conditions. For a blackout condition, a backspin controller uses regenerative power to provide controlled deceleration of the pump, counteracting backspin and preventing backspinning freely. For a brownout condition, a power dip controller weakens the motor field to maximize pump production consistent with reduced input power availability. For a phase loss or voltage imbalance condition, a phase loss controller reduces motor power output to keep drive system output power at or below single phase capacity.

19 Claims, 16 Drawing Sheets

RESET INTEGRATOR IF SUM AT 146>
MOTOR HORSE POWER AT TORQUE LIMIT
* WINDUP FACTOR OR SUM AT POINT 146<0

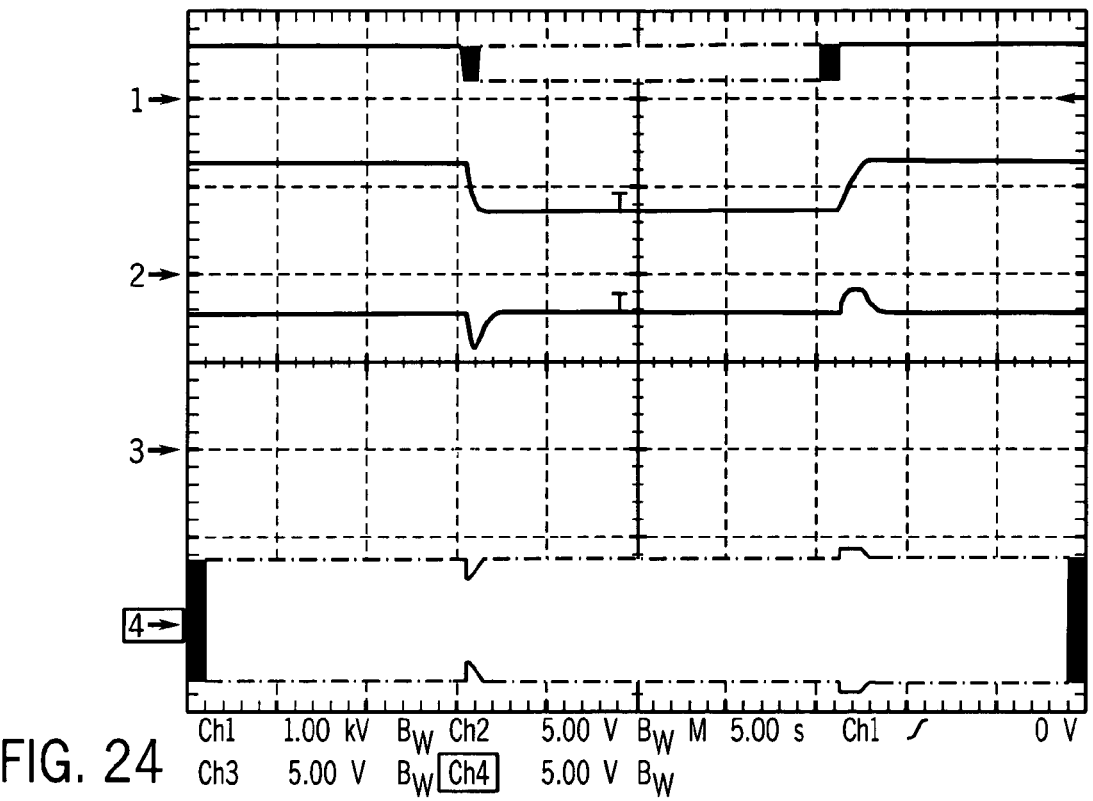

| INPUT PARAMETERS | VALUE | CALCULATED PARAMETERS | VALUE |
|---|---|---|---|
| INFLOW TYPE (0=LINEAR, 1=VOGEL) | 1 | BACKSPIN LIMIT AVE FLOW (Bpd) | 308 |
| WELL FLUID DENSITY (Psi/Ft) | 0.434 | DELAY TIMER AVE FLOW (Bpd) | 196 |
| WELL STATIC HEAD (FEET) | 4930 | BACKSPIN LIMIT FLOW LOSS (%) | 0.7% |
| WELL MAXIMUM FLOW (Bpd) | 1090 | DELAY TIMER FLOW LOSS (%) | 36.6% |
| CASING DIAMETER (INCHES) | 6.689 | | |
| TUBING DIAMETER (INCHES) | 3.958 | VARIABLE PARAMETERS | |
| ROD STRING DIAMETER (INCHES) | 1.125 | CASING FLUID FLOW (Bpd) | |
| PUMP INTAKE DEPTH (FEET) | 8100 | TUBING FLUID FLOW (Bpd) | |
| PUMP RATED FLOW (Bpd) | 310 | CASING FLUID LEVEL (FEET) | |
| PUMP RATED PRESSURE (Psi) | 4330 | TUBING FLUID LEVEL (FEET) | |
| PUMP RATED SPEED (Rpm) | 250 | | |
| PUMP BACKSPIN SPEED (Rpm) | 250 | | |
| PUMP STATIC TORQUE (Ft*Lbs) | 20 | | |
| PUMP RESTART DELAY (MINUTES) | 360 | | |
| PUMP ACCEL TIME (MINUTES) | 5 | | |
| TOTAL PLOT TIME (MINUTES) | 720 | | |
| POWER OUTAGE TIME (MINUTES) | 10 | | |
| POWER OUTAGES PER DAY | 1 | | |

| PUMPING SYSTEM PARAMETERS | PHASE LOSS | | | POWER DIP | | | POWER LOSS | | |
|---|---|---|---|---|---|---|---|---|---|
| PUMP OPERATING SPEED (%) | 100% | 100% | 100% | 100% | 100% | 100% | 100% | 100% | 100% |
| PUMP OPERATING TORQUE (%) | 50% | 50% | 50% | 50% | 50% | 50% | 100% | 100% | 100% |
| POWER DISTURBANCE DEPTH (%) | 33% | 33% | 33% | 50% | 50% | 50% | 100% | 50% | 100% |
| DISTURBANCE DURATION (SECONDS) | 0.5 | 0.5 | 3600.0 | 0.5 | 3600.0 | 3600.0 | 0.5 | 0.5 | 3600.0 |
| DISTURBANCE FREQUENCY (PER DAY) | 1 | 1 | 1 | 1 | 1 | 1 | 1 | 1 | 1 |
| BACKSPIN SPEED LIMIT (%) | 100% | 100% | 100% | 100% | 100% | 100% | 100% | 100% | 100% |
| BACKSPIN DELAY TIME (MINUTES) | 180 | 180 | 180 | 180 | 180 | 180 | 180 | 180 | 180 |
| STANDARD CONTROL PRODUCTION LOSS | | | | | | | | | |
| BACKSPIN DELAY TIMER | 25.0% | 25.0% | 29.2% | 25.0% | 25.0% | 29.2% | 25.0% | 25.0% | 29.2% |
| LINE REGENERATIVE DRIVE | 25.0% | 25.0% | 29.2% | 0.0% | 0.0% | 2.1% | 25.0% | 25.0% | 29.2% |
| OPTIONAL CAPACITOR BANK | 25.0% | 25.0% | 29.2% | 0.0% | 29.2% | 29.2% | 0% | 0% | 29.2% |
| IMPROVED CONTROL PRODUCTION LOSS | | | | | | | | | |
| PHASE LOSS OPTIMIZER | 0.0% | 0.0% | 2.1% | | | | | | |
| POWER DIP OPTIMIZER | | | | 0.0% | 0.0% | 2.1% | | | |
| BACKSPIN CONTROLLER | | | | | | | 0% | 0% | 4.2% |

FIG. 25

METHOD AND SYSTEM FOR IMPROVING PUMP EFFICIENCY AND PRODUCTIVITY UNDER POWER DISTURBANCE CONDITIONS

CROSS REFERENCE TO RELATED APPLICATIONS

This application claims priority of provisional application Ser. No. 60/581,282, which is entitled "Method and System for Improving Pump Efficiency and Productivity under Power Outage Conditions", which was filed on Jun. 18, 2004, provisional application Ser. No. 60/668,016, which is entitled "Method and System for Improving Pump Efficiency and Productivity under Power Outage Conditions", which was filed on Apr. 4, 2005, provisional application Ser. No. 60/668,316, which is entitled "Method and System for Improving Pump Efficiency and Productivity under Power Outage Conditions", which was filed on Apr. 5, 2005, and provisional application Ser. No. 60/670,401, which is entitled "Method and System for Improving Pump Efficiency and Productivity under Power Disturbance Conditions", which was filed on Apr. 12, 2005, the entirety of these applications hereby being incorporated herein by reference.

BACKGROUND OF THE INVENTION

Field of the Invention

The present invention relates generally to pumping systems used in the production of oil and other liquids, for example, and more particularly, to a method and system for improving the efficiency and productivity of progressing cavity and electrical submersible pumps under power disturbance conditions.

Disturbances in the electrical power to variable speed drives operating progressing cavity pumps (PCP) and electrical submersible pumps (ESP) can cause significant safety, reliability, and production problems. For example, during normal pumping operation, a PCP provides significant amounts of energy to wind up the rod string, lift fluid to the surface, and lower the casing fluid level. During a power outage condition, the pump and its associated drive system lose the ability to control the energy stored in the system. Wound-in rod string torque and fluid load on the pump can cause the pump to backspin when power to the motor is cut off. An uncontrolled backspin can reach speeds that are many times the rated speed of the system. Completely uncontrolled backspin can also create excess speed that is unsafe to personnel and or damaging to the rod string or other equipment.

Loss of control of a PCP due to power disturbances causes the pump to backspin which drains fluid from the production tubing. Backspin times can last from minutes to hours depending on the specifics of the pump application. Deep wells will generally have longer backspin times than shallow wells or wells operating with high casing fluid levels.

The actual loss of production time could be more than twice the backspin time since fluid drained from the tubing and must be pumped back to the surface. Frequent power disturbances can significantly diminish productive capacity. Completely uncontrolled backspin can also create excess speed that is unsafe to personnel and/or damaging to equipment.

There are four power disturbance conditions that can cause the pump drive to fault out and leave the pump spinning backward. The four power outage conditions are: 1) a power loss or blackout condition, in which the power may go out completely, 2) a power dip or brownout condition in which the incoming voltage may be present but at reduced voltage level, 3) a phase loss condition in which the incoming three phase voltage may be reduced to single phase, and 4) a voltage imbalance condition in which the incoming three phase voltages are out of balance.

There are several drive innovations that can be used to improve safety, reliability, and production during power disturbances. Mechanical, electrical, and hydraulic braking systems have been added to PCP drive heads to prevent injury to personnel as well as damage to the rod string or other equipment. Backspin detectors have also been used in PCP and ESP applications to prevent restarting of the pumps until all stored energy has been exhausted from the system. These protective systems must be properly set up and maintained for reliable operation. Even so, there is a finite chance that PCP drive head braking mechanisms can fail to operate correctly during a backspin. Unsafe operation can be caused by incorrect set up, improper maintenance, or system component failure, for example.

Moreover, starting into a backspinning pump can cause erratic torque that damages the PCP rod string or the ESP motor and/or pump. Restart delays have been introduced to prevent this type of starting and its associated potential for pumping system damage. PCP and ESP drive systems can include a restart timer that delays pump operation after a power outage to ensure that the pump drive does not start into a backspinning load when power is restored. Restart delays allow energy stored in rod windup and fluid levels to dissipate before restarting the pump. Unfortunately, the restart delays that are required may be up to several hours on deep wells. Frequent power outages combined with long restart delays can significantly reduce production.

The restart delay should be no longer than necessary for the motor speed and torque to have diminished to zero. Known methods of setting the restart delay can result in arbitrarily long delays, which sacrifices production, or can be result in excessively short delays, which risks damage to the pumping system.

FIG. 26 shows typical parameters for a PCP installation including power outage information, pump backspin speed, pump restart delay, pump acceleration time and power outage time. FIG. 27 shows the behavior of casing and tubing flows and levels during a power outage event. The loss in production from a single power outage event using a backspin delay timer can be significant (36.3%) for a deep well such as shown in this example.

It is accordingly the primary objective of the present invention that it provide a method and system for improving the efficiency and productivity of progressing cavity and electrical submersible pumps under power disturbance conditions.

It is another objective of the present invention that it maintain the control for a progressing cavity or electrical submersible pump operating during a power disturbance, including brownout conditions.

The system of the present invention must also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, there is provided a pump drive for a progressing cavity or electrical submersible pump that maintains pump operation under power disturbance conditions.

In accordance with the invention, there is provided a method for controlling the operation of a pump that is driven by an electric motor driven by a variable speed drive to maintain the motor operating in the event of a power disturbance. The method comprises the steps of detecting the occurrence of an electrical power disturbance and determining whether the power disturbance is a brownout condition. A power dip controller is used to provide controlled operation of the motor when the power disturbance is determined to be a brownout condition. The power dip controller provides controlled weakening of the motor field current and motor flux as the bus voltage decreases during the power disturbance condition.

The present invention further provides a method for controlling the operation of a pump for optimizing pump efficiency and productivity under electrical power disturbance conditions, wherein the pump is driven by an AC electrical motor having a motor drive energized by a voltage derived from a bus voltage. The method includes the steps of monitoring the bus voltage; detecting the occurrence of an electrical power disturbance by determining when the amplitude of the bus voltage decreases below a predetermined value, indicative of a voltage sag condition; and providing controlled operation of the motor under a voltage sag condition by weakening motor field current and motor flux of the motor as the bus voltage decreases during the voltage sag condition.

In addition, the present invention provides a system for controlling the operation of a pump for optimizing pump efficiency and productivity under electrical power disturbance conditions, wherein the pump is driven by an AC electrical motor having a motor drive. The system includes a voltage monitor for providing an output signal indicative of the amplitude of a bus voltage; a plurality of parameter monitors for providing outputs indicative of at least one operating parameter of the motor; and a power dip controller for detecting a power dip condition and to provide controlled operation of the pump motor during the power dip condition by reducing the motor field current and motor flux to reduced values for the motor as the bus voltage decreases during the power dip condition.

The method and system of the present invention maintain a pump running as fast as possible in spite of any power disturbance condition to maximize productivity and efficiency. Brownout conditions are addressed by a power dip controller provided by the present invention, which will keep the drive running using the power dip controller under a brownout condition.

The system of the present invention is of a construction which is both durable and long lasting, and which will require little or no maintenance to be provided by the user throughout its operating lifetime. The apparatus of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 25 is a table illustrating power disturbance losses for various control techniques and operating conditions;

FIG. 26 is a table of typical parameters for a PCP installation including power outage information.

DETAILED DESCRIPTION OF THE PREFERRED EMBODIMENT

The method and system of the present invention control the operation of a pump that is controlled by a variable speed drive operating by an electric motor to maintain the motor operation during electrical power disturbances. When the occurrence of an electrical power disturbance is detected, the drive operates the motor at reduced capacity for sags in input voltage, the loss of an in-coming phase, or an imbalance in supply voltages and power is maintained for at least a portion of the duration of the electrical power outage using regenerative electrical power produced as the result of a reverse drive applied to the motor due to the fluid load on the pump.

Figure 2:
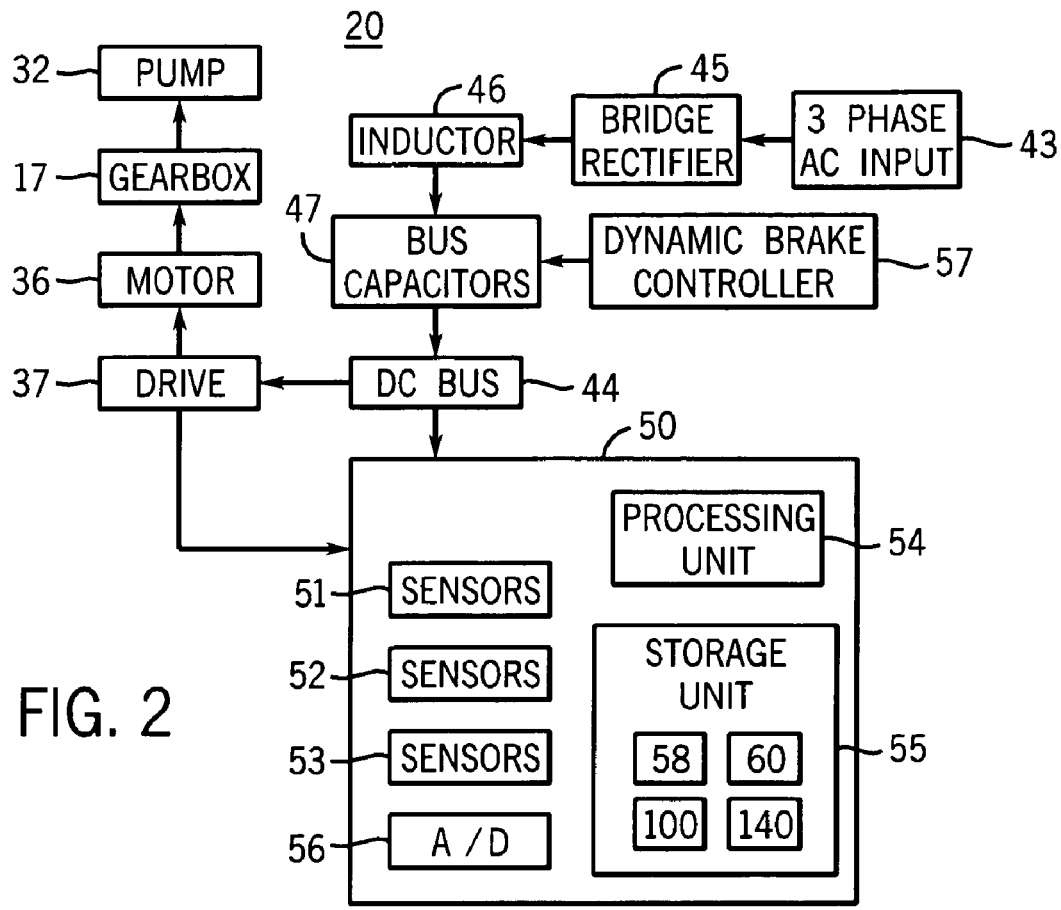
FIG. 2 is a block diagram of the progressing cavity pump control system of FIG. 1 including the backspin controller, the power dip controller and the phase loss controller.

As stated above, there are four power disturbance conditions that can cause the pump drive to fault out and leave the pump spinning backward. Blackout conditions are addressed by a backspin controller 60 (FIG. 2). Brownout conditions are addressed by a power dip controller 100 (FIG. 2) provided by the present invention. Phase loss and voltage imbalance conditions are addressed by the phase loss controller 140 (FIG. 2) provided by the present invention. While the pump control system is described herein as including a backspin controller, a power dip controller and a phase loss controller, alternatively the pump control system can include only a backspin controller, or a power dip controller or a phase loss controller, or the pump control system can include any combination of these controllers depending upon the application of the pump control system. Also, setpoints can be established for parameters, such as bus voltage, to allow only either the backspin controller, power dip controller, or phase loss controller to operate for a preselected range of values for the parameters, with suitable transitioning being provided in accordance with changes in the parameter values.

The method and system of the invention are described with reference to the control of the operation of a pump that is driven by an electric motor by a variable speed drive to substantially eliminate the effects of backspin in the event of a power outage. The system includes a backspin controller that is maintained during power outages to seize control of the motor, providing controlled operation of the pump to counteract backspin and prevent the pump from backspinning freely.

The backspin controller can be used to control progressing cavity or electrical submersible pumps and to maintain control of the operation of the pumps during electrical power outage conditions, thereby providing improved operating efficiency and productivity for the pump. The backspin controller maintains control of the operation of the PCP or ESP pump during power outages, counteracting backspin, preventing the pump from freely backspinning, and allowing the pump to be restarted quickly upon restoration of electrical power. For purposes of description of the invention, the backspin controller is described with reference to an application for controlling a PCP pump. However, the backspin controller also can be used to control the operation of ESP type pumps.

Figure 1:
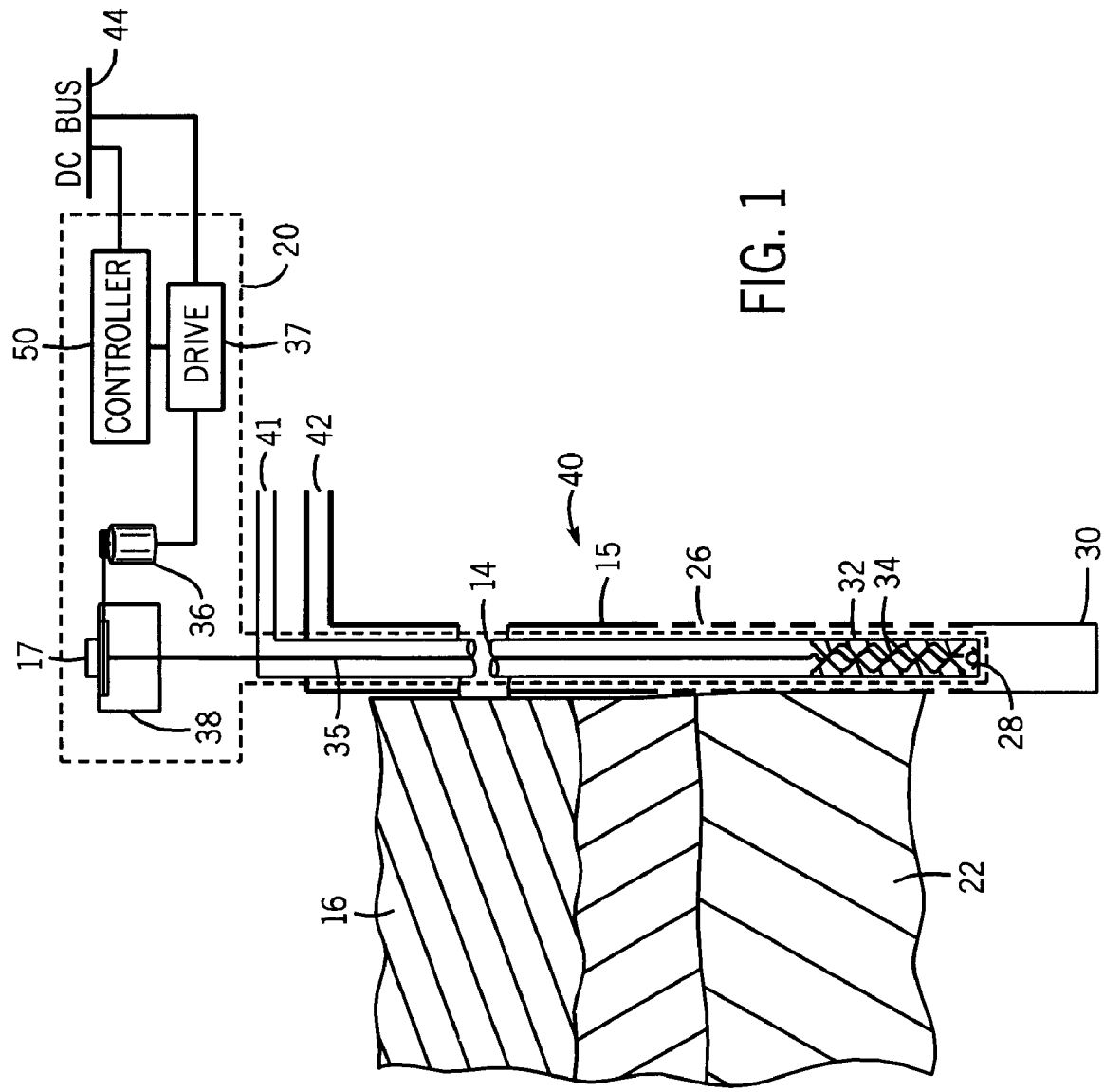
FIG. 1 is a simplified representation of a well including a progressing cavity pump, the operation of which is controlled by a pump control system incorporating a backspin controller, a phase loss controller, and a power dip controller in accordance with the present invention.

Referring to FIG. 1, there is shown a block diagram of a pump control system incorporating a pump backspin controller provided by the present invention. The present invention is described with reference to an oil well 40 wherein oil is to be separated from an underground formation 22. The well includes an outer well casing 15 and an inner production tubing 14 that extend from ground level to as much as 1000 feet or more below ground level. The casing 15 has perforations 26 to allow the fluid in the underground formation to enter the well bore. It is to be understood that water can be combined with oil and the pump can be used for other liquids. The control apparatus can also be used for water only.

A progressing cavity pump (PCP) 32 is mounted at the lower end of the tubing 14 and includes a helix type of pump member 34 mounted inside a pump housing. The pump member is attached to and driven by a pump rod string 35 which extends upwardly through the tubing and is rotated by a motor 36 in a conventional well head assembly 38 above ground level. The tubing 14 has a liquid outlet 41 at the upper end above ground level 16. These elements are shown schematically in FIG. 1. The construction and operation of the progressing cavity pump is conventional.

The operation of the pump 32 is controlled by a pump control system and method including a parameter estimator which can be similar to the parameter estimator disclosed in U.S. application Ser. No. 10/655,778 which was filed on Sep. 5, 2003 and published as publication number US-2004-0062658 A1, and which is incorporated herein by reference. The pumping system includes an electric drive 37 and motor 36 that rotates the rod string 35 that includes helix portion 34 of the pump 32. The rod string 35 is suspended from the well head assembly 38 for rotating the helix 34 that is disposed near the bottom 30 of the well.

The rod string 35 is driven by an electric motor 36, the shaft of which can be coupled to the rod string through a gearbox 17 or similar speed reduction mechanism. The motor 36 can be a three-phase AC induction motor designed to be operated from line voltages in the range of 230 VAC to 690 VAC and developing 5 to 250 horsepower, depending upon the capacity and depth of the pump. Electrical power for the electric drive system 37 as well as for a system controller 50 is obtained from a system DC voltage bus 44 which is derived by rectification of the incoming AC power from a utility or a generator. The drive system 37 includes an inverter for converting DC from the system voltage bus 44 to 3-phase AC for driving the motor 36. The gearbox 17 converts motor torque and speed input to a suitable torque and speed output for driving the rod string 35 and helix 34 carried thereby. As is known, as the PCP is driven in normal operation, the fluid column stores potential energy due to the drive operation of the pump with the rod string moving fluid upwards. Power is equal to the product of torque and speed. The pump motor drive system can be controlled in a regenerative condition by commanding a negative motor torque when motor speed is positive or a positive motor torque when motor speed is negative.

Pump Control System

Referring to FIG. 2, there is shown a simplified representation of the pump control system 20 for the pump 32. In one embodiment, signals for controlling the operation of the pump 32 are derived from values of motor speed and torque estimates as disclosed in detail in the above-referenced publication number US-2004-0062658 A1. The control signals are produced using measured values of instantaneous motor currents and voltages, together with pump and system parameters, without requiring down hole sensors, echo meters, flow sensors, etc. This self-sensing control arrangement provides nearly instantaneous estimates of motor velocity and torque, which can be used for both monitoring and real-time, closed-loop control of the pump. For example, in one embodiment, instantaneous estimates of motor velocity and torque are provided at the rate of about 1000 times per second. However, the backspin controller can be used in other pump control systems, including known pump control systems of the type that employ down hole sensors, motor speed encoders, echo meters, flow sensors, etc.

A 3-phase AC line voltage is supplied to a power input circuit of the pump control system from a 3-phase AC power source 43. Typically, the power input circuit is a bridge rectifier 45 that converts the AC power to unregulated DC bus voltage 44. Phase shift transformers can be used with additional rectifier sections to reduce AC line harmonic currents. The DC voltage bus 44 uses capacitors 47 for voltage smoothing and energy storage. An inductor 46 may be included to help smooth the current flow to the bus capacitors 47.

Optionally, the pump control system 20 can include a shunt regulator or dynamic brake controller 57, shown in FIG. 2, to prevent overvoltage faults. The dynamic brake controller 57 can be of conventional design, for example. By way of a non-limiting example, the dynamic brake controller 57 can include a switching device that is operable to connect an energy dissipating device to the bus capacitors 47 and associated circuitry in response to an overvoltage condition. The switching device can be a solid state switching device, such as a switching transistor, a controlled rectifier and the like. The energy dissipation device can be formed by one or more dynamic braking resistors.

The dynamic brake controller 57 responds to changes in bus voltage, with an overvoltage condition causing energy stored by the bus capacitors 47 to be dissipated. For example, when the bus voltage exceeds a setpoint or "turn on" value for the switching transistor, the bus voltage can cause the switching transistor to be turned on, connecting the dynamic braking resistor across the capacitors to allow the bus capacitors to begin to discharge, thereby reducing the bus voltage by dumping energy into the dynamic braking resistor. When the bus voltage is reduced to a "turn off" value for the switching transistor, the switching transistor is turned off, disconnecting the dynamic braking resistor from the bus capacitors to disable the voltage regulating function being provided by the dynamic brake controller. The dynamic brake controller option makes the backspin controller more 60 robust since the initial speed in reverse can be set higher without fear of an over voltage fault.

Variable speed drives rectify the AC line voltage into a DC bus voltage that is converted by output switching devices into the variable frequency voltage used to control the motor. The DC bus voltage is applied to bus capacitors 47 that store electrical input energy for transfer to the output. The energy stored in the bus capacitors 47 is a function of their capacitance and the square of the applied voltage. Normal bus capacitors 47 will provide enough energy storage to ride through power outages of about 0.05 seconds.

The pump control system 20 includes transducers, such as motor current and motor voltage sensors, to sense dynamic variables associated with motor load and velocity. The pump control system further includes the system controller 50. Current sensors 51 of interface devices are coupled to a sufficient number of the motor windings—two in the case of a three phase AC motor. Voltage sensors 52 are connected across the motor winding inputs. A voltage sensor 53 is connected to the DC voltage bus 44. The motor current, motor voltage and bus voltage signals produced by the sensors 51, 52 and 53 are supplied to a processing unit 54 of the system controller 50 through analog to digital (A/D) converters 56. The system controller 50 further includes a storage unit 55 including storage devices which store programs and data files used in calculating operating parameters and producing control signals for controlling the operation of the pump system. The calculation data are stored in a memory 57. The stored programs include software implementing the backspin controller 60, the power dip controller 100 and the phase loss controller 140 provided by the present invention.

Motor currents and voltages are sensed to determine the instantaneous electric power drawn from the power source by the electric motor operating the pump. As the rod string 35 (FIG. 1) that drives the progressing cavity pump 32 is rotated, the motor 36 is loaded. By monitoring the motor current and voltage, the calculated torque and speed produced by the motor are used to calculate estimates of fluid flow and head pressure produced by the pump.

More specifically, the interface devices include devices for interfacing the system controller 50 with the outside world. Sensors in blocks 51, 52 and 53 can include hardware circuits which convert and calibrate the motor current, motor voltage, and bus voltage signals. After scaling and translation, the outputs of the voltage and current sensors can be digitized by analog to digital converters in block 56. The processing unit 54 combines the scaled signals with motor equivalent circuit parameters stored in the storage unit 55 to produce a precise calculation of motor torque, motor velocity, and bus power flow.

Backspin Control

In practice, the backspin control is constrained by a minimum and maximum DC bus voltage, torque limits and control loop bandwidth. The weight of the fluid column and the pump characteristics determine the load torque on the motor. This then, along with the losses in the pump drive system, determines the reverse velocity required to keep the drive operating during power outage conditions in which utility voltage is not sufficiently adequate to power the voltage bus 44. Since regenerated power and system losses both tend to move in unison with torque, the required reverse velocity is relatively constant and can be estimated from known system parameters.

State Machine

Figure 3:
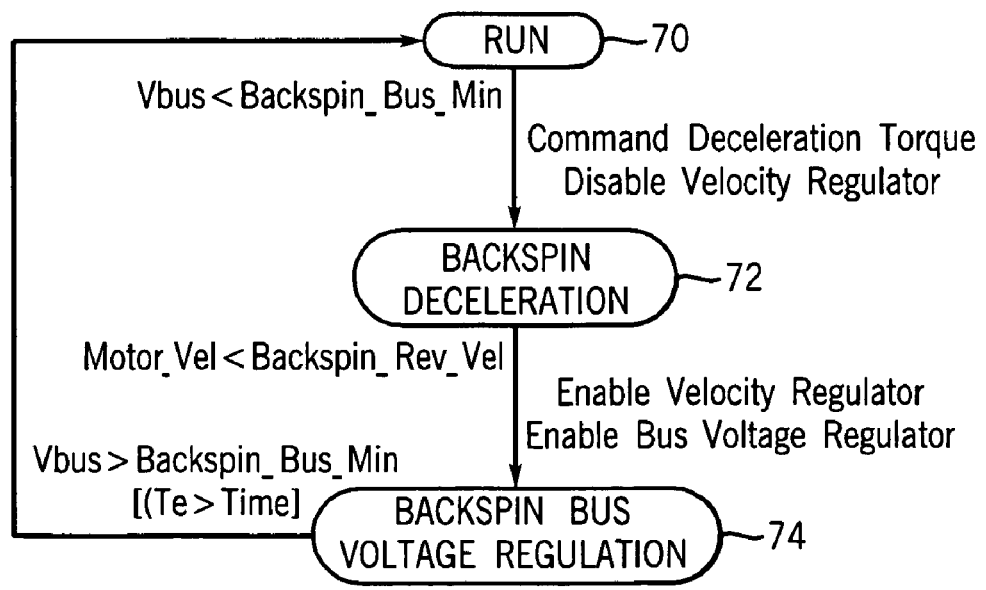
FIG. 3 is a state diagram for the backspin controller of FIG. 2.
Figure 5:
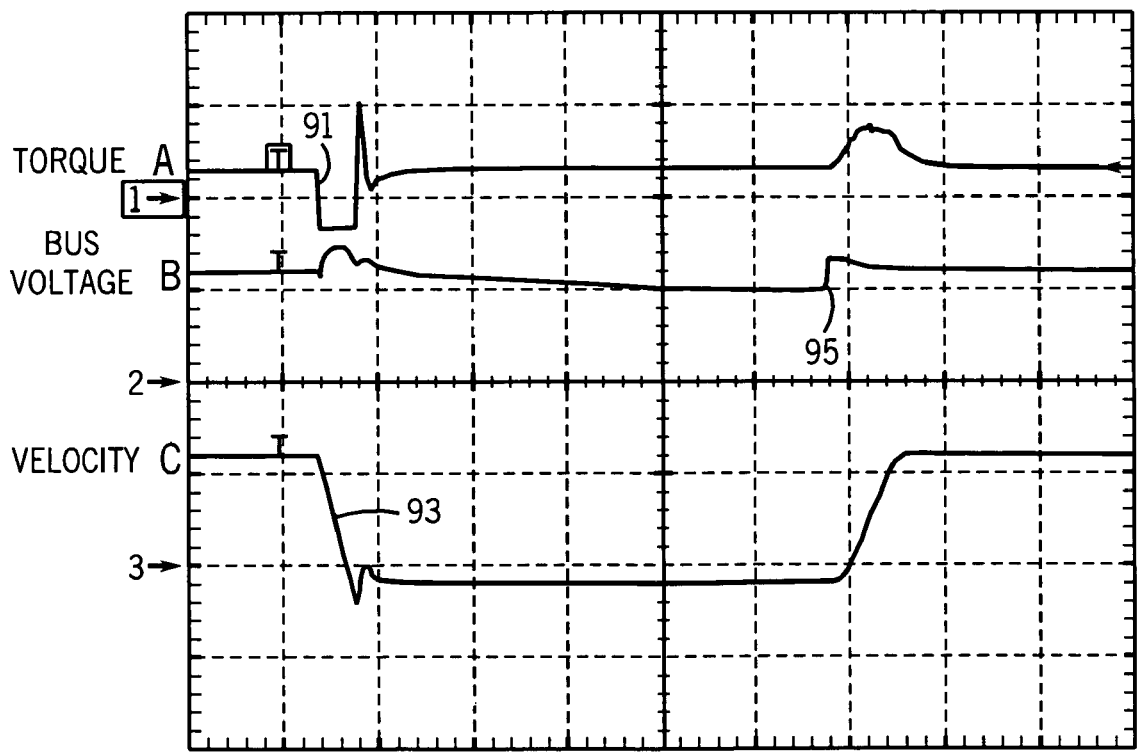
FIG. 5 illustrates waveforms obtained by a laboratory dynamometer experiment of the backspin controller.

FIG. 3 illustrates a finite state machine for the backspin controller 60 shown in FIG. 2. For the sake of clarity, positive torque and speed on the motor, rod and pump rotor are defined to be in the direction that produces fluid up the tubing 14 (FIG. 1). Negative torques and speeds are in the opposite direction. Also, by way of illustration, FIG. 5 shows waveforms obtained by a laboratory dynamometer experiment of the backspin controller 60. FIG. 5, line A shows torque, FIG. 5, line B shows the bus voltage and FIG. 5, line C shows velocity.

Referring to FIGS. 1 and 3, the backspin controller 60 responds to a power outage and, taking advantage of the reverse drive applied to the motor 36 due to the fluid load on the pump 32, uses the regenerated electrical power produced by the motor 36 to maintain the pump drive system (including the backspin controller 60) in an operational state. The pump drive system causes the rod string 35 to be rotated in the reverse direction, but at a controlled speed determined by the backspin controller 60. In this way, free backspin is prevented and control of the operation of the pump 32 is maintained. The backspin controller 60 monitors the bus voltage Vbus and detects when the bus voltage Vbus again exceeds the threshold value, indicative of restoration of power, and the state machine transfers back to the normal RUN mode, allowing the pump 32 to be restarted.

More specifically, with reference to FIG. 3, the start or RUN state 70 represents the normal RUN condition in which the pump is operating. When a power outage is detected, as indicated by detection that the bus voltage Vbus on the voltage bus 44 has decreased below a set point value (Vbus<Backspin_Bus_Min), this indicates that the voltage being supplied by the utility to energize the voltage bus 44 is decreasing. For this condition, when Vbus<Backspin_Bus_Min, a velocity regulator is disabled and a negative torque is commanded, as indicated by reference number 91 in FIG. 5, line A. The state machine transitions from the normal RUN mode to a forward REGENERATIVE mode or BACKSPIN DECELERATION state 72.

Upon transitioning to the BACKSPIN DECELERATION state 72, the backspin controller 60 commands a deceleration torque to provide controlled deceleration of the motor (FIG. 5, line C). As the initial run velocity is positive and the motor drive torque is negative, the drive immediately enters a forward regenerative condition, which maintains the DC bus voltage FIG. 5, line B and causes the motor and pump to decelerate from the positive run velocity (reference number 93 in FIG. 5, line C). The negative torque command is maintained, allowing the motor and pump to decelerate through zero velocity (FIG. 5, line C) and into a reverse direction. It is pointed out that the condition of reversal of rotation of the pump combined with the negative torque results in a brief period wherein energy is drawn from the DC voltage bus, lowering its value (FIG. 5, line B). However, this transition is over quickly and the backspin controller maintains control and then switches to a BACKSPIN BUS VOLTAGE REGULATION state 74. Alternatively, and depending upon the fluid being pumped, when the speed reaches zero, a zero torque can be commanded, allowing the load to reverse. When the pump velocity decreases below a setpoint value, Motor_Vel<Backspin_Rev_Vel, indicative of a reversal in the direction of rotation of the pump, the state machine transitions to the BACKSPIN BUS VOLTAGE REGULATION state 74, which is a reverse regeneration. In the BACKSPIN BUS VOLTAGE REGULATION state 74, the motor velocity regulator and the bus voltage regulator are enabled to control the reverse regeneration.

It is important that the Backspin_Rev_Vel speed be maintained at the proper value. If the speed is too low, the drive will trip on undervoltage before the backspin bus voltage regulator can increase the speed. If the speed is too high, the drive will trip with an overvoltage fault before the bus voltage regulator can decrease the speed. In either case, control of backspin is lost. The setpoint value Backspin_Rev_Vel for backspin reverse velocity is set to a value that is neither too high nor too low when no dynamic brake controller is used. When the optional dynamic brake controller 57 (FIG. 2) is used, the setpoint value Backspin_Rev_Vel for the backspin reverse velocity is set high enough to prevent an undervoltage condition and the voltage regulating function provided by the dynamic brake controller 57 (FIG. 2) prevents overvoltage conditions. The dynamic brake controller 57 allows the Backspin_Rev_Vel speed to be set high since the dynamic brake controller 57 will prevent overvoltage faults. The voltage regulating function provided by the dynamic brake controller 57 makes the Backspin_Rev_Vel speed less critical and makes the backspin controller 60 more reliable. Once running reverse, the backspin bus voltage regulator of the backspin controller 60 can gradually reduce the reverse speed, allowing the dynamic brake controller 57 to turn off. The dynamic brake controller 57 can operate independently of the backspin controller 60 or can be enabled along with the backspin controller 60 in response to a power disturbance. In either case, the setpoint value Backspin_Rev_Vel for the backspin reverse velocity can be set high enough to prevent undervoltage condition with the voltage regulating function provided by the dynamic brake controller 57 preventing overvoltage conditions.

For an extended power outage, the fluid column will become depleted. As the fluid column decreases, the load torque decreases because potential energy will decrease. At some point, prior to the column becoming depleted, the potential energy will be insufficient to overcome motor losses and the regulator will shut off. However, because the fluid column is substantially depleted, this presents a safe condition for startup which can occur immediately upon restoration of power.

The BACKSPIN BUS VOLTAGE REGULATION state 74 provides regulation of the bus voltage Vbus during the power outage until restoration of electrical power to the voltage bus 44 is detected. In one embodiment, the bus voltage is regulated at a value Vreg, where Vreg=0.9*Backspin_Bus_Min.

When the bus voltage Vbus increases (reference number 95 in FIG. 5, line B) to exceed the threshold value Backspin_Bus_Min, (Vbus>Backspin_Bus_Min) the state machine transitions back to the initial RUN state 70 and the pump accelerates to the positive run velocity. Typical variable speed drive current, torque or acceleration rate limiters can be used to control the return to the normal operating speed. Alternatively, transitioning from the BACKSPIN BUS VOLTAGE REGULATION state to RUN state can be conditioned additionally upon the elapsed time from the loss of power. In such embodiment, the transition from the BACKSPIN BUS VOLTAGE REGULATION state to RUN state can occur only when Te>Time (a time duration setpoint) in addition to the condition that Vbus>Backspin_Bus_Min. This alternative condition is shown in brackets in FIG. 3. This alternative condition affords the control with a degree of immunity to brief power outage glitches by maintaining backspin control mode for a minimum time duration.

Backspin Controller

Figure 4:
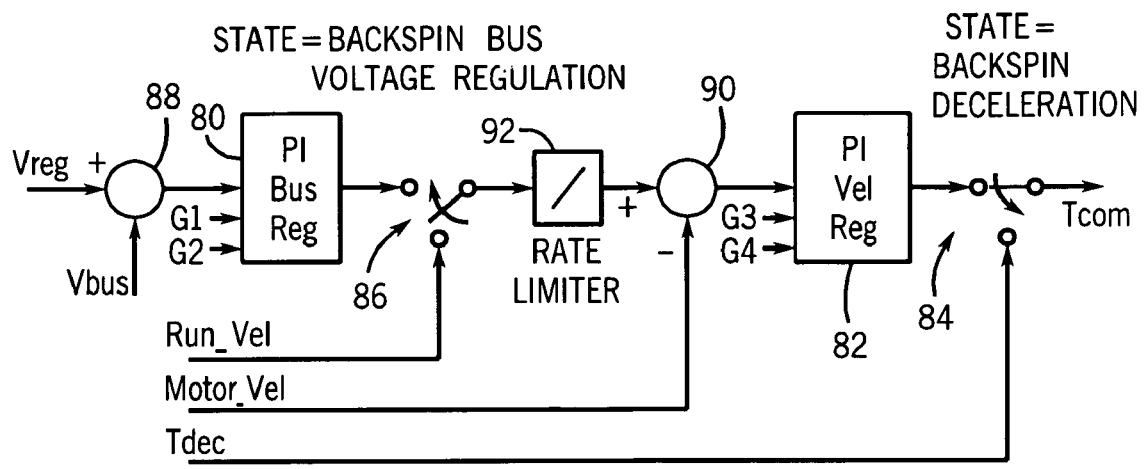
FIG. 4 is a block diagram of the backspin controller of FIG. 2.

Referring to FIG. 4, there is shown a block diagram of a backspin controller 60 that works in conjunction with the finite state machine illustrated in FIG. 3.

The backspin controller 60 includes a backspin bus regulator 80, implemented by a proportional integral (PI) component and a velocity regulator 82, implemented by a further PI component. A selector 84 closes to connect the backspin deceleration torque reference Tdec to the torque command output Tcom when the state equals the BACKSPIN DECELERATION state 72 (FIG. 3). Otherwise, the output of component 82 is connected. A selector 86 selects the velocity reference from the output of component 80 when the state equals the BACKSPIN BUS VOLTAGE REGULATION state 74 (FIG. 3). Otherwise, the run velocity setpoint Run_Vel is connected. The selectors 84 and 86 are controlled by the Finite State Machine (FIG. 3).

The operational inputs to the backspin controller 60 include the bus voltage Vbus and the velocity Motor_Vel. In addition, the backspin controller 60 includes a plurality of inputs for setpoint values and gain conditions. These inputs include a setpoint Vreg=0.9*Backspin_Bus_Min. When operating in the BACKSPIN BUS REGULATION State, the controller regulates at Vreg which is 90% of Backspin_Bus_Min. Under normal power conditions, Vbus is 630 vdc in one example. With no utility power, the backspin controller would regulate the bus at 540 vdc in the BACKSPIN BUS VOLTAGE REGULATION state 74 for a Backspin_Bus_Min setting of 600 vdc. Thus, power restoration is easily detected by the voltage changes from 540 vdc to 630 vdc. A reverse velocity Backspin_Rev_Vel is used as the setpoint value to cause transition from the deceleration state to the bus voltage regulation state. A further input, the backspin deceleration torque, Tdec, is the negative torque command in response to detection of a power outage condition.

When the bus voltage exceeds the 600 vdc setpoint (Backspin_Bus_Min) in one embodiment, this is indicative that the utility power has been reapplied to the power input circuit of the pump control system.

An integral gain factor G1 (Backspin_Ki) is used in the bus voltage regulation state. A proportional gain factor G2 (Backspin_Kp) is used in the bus voltage regulation state. Similar PI gain factors G3 and G4 are used in the velocity regulator.

FIG. 4 illustrates the conditions for the normal RUN state, with selector 86 applying run velocity command, Run_Vel, to the rate limiter 92 and selector 84 extending the output of the velocity regulator 82 to the output of the backspin controller 60 which is a torque command Tcom for the motor drive. The rate limiter 92 limits the rate of change of the speed setpoint (or acceleration). In the normal RUN state, summing block 90 combines the motor velocity Motor_Vel with the run velocity setpoint Run_Vel*. The output of the summing block 90 is applied to the velocity regulator 82 which produces a torque command Tcom for application to the motor drive for maintaining the motor at the setpoint value.

The bus voltage Vbus is combined with the bus voltage setpoint Vreg by summing block 88, the output of which is applied to the bus voltage regulator 80. The Finite State Machine (FIG. 3) causes the selector 84 to switch to the BACKSPIN DECELERATION state when a power outage is detected. The selector 84 is operated to extend the backspin deceleration torque Tdec signal to the output of the backspin controller 60. Otherwise, selector 84 connects to the output of the velocity regulator 82.

When operating in the BACKSPIN BUS VOLTAGE REGULATION state, a velocity command, that is the output of the bus regulator 80 is applied through the selector 86 and the rate limiter 92 to summing block 90. Otherwise, the run velocity setpoint is connected to the rate limiter 92, for example, during the normal run mode.

Referring to FIG. 3, in operation, the start state represents the normal RUN condition in which the pump is operating, producing a fluid flow up the tubing. In the event of a power outage, voltage on the voltage bus 44 begins to decrease. When the threshold is reached (Vbus<Backspin_Bus_Min), the velocity regulator is disabled and the backspin controller 60 commands a deceleration torque, Tdec, causing the system to transition to the next state. Upon transitioning to the next state, the backspin controller 60 provides controlled operation of the pump.

With reference to FIGS. 2 and 4, briefly, the backspin controller 60 monitors the bus voltage and whenever the bus voltage decreases below a threshold level, transfers operation from the normal RUN mode to a regenerative mode. While operating in the regenerative mode, the backspin controller 60 is operated and provides controlled operation of the pump, terminating in a slow reverse velocity, allowing the pump to be restarted when electrical power is restored.

Referring to FIGS. 3 and 4, in operation, the RUN state 70 represents the normal RUN condition in which the pump is operating, producing a fluid flow up the production tubing. Selectors 84 and 86 are in the positions shown in FIG. 4. The bus voltage Vbus typically is about 630 vdc. The velocity regulator 82 maintains the velocity of the pump at the setpoint Run_Vel. The backspin controller 60 monitors the bus voltage Vbus. Whenever the bus voltage decreases below the 600 vdc threshold level, (Vbus<Backspin_Bus_Min), indicative of a power outage, the backspin controller transfers operation from the normal run mode to a regenerative mode. When operating in a regenerative mode, the backspin controller 60 uses stored energy from the system to maintain internal control voltage on the system during the power failure. The motor drive power is maintained by commanding the motor drive to be in a power regenerative condition, using the potential and kinetic energy of the motor and fluid column above the pump as the energy source.

More specifically, when the bus voltage Vbus decreases below the setpoint 600 vdc, selector 84 is operated to disconnect the velocity regulator 82 and apply a negative deceleration torque, Tdec. Upon transitioning to the BACKSPIN DECELERATION state 72, the backspin controller 60 is maintained energized and provides controlled deceleration of the motor.

The motor slows as the result of the negative torque provided in the BACKSPIN DECELERATION state 72. When the motor velocity decreases below a negative velocity setpoint (Motor_Vel<Backspin_Rev_Vel), the state transitions from the BACKSPIN DECELERATION state 72 to the BACKSPIN BUS VOLTAGE REGULATION state 74. The selector 84 is operated, disconnecting the deceleration torque command Tdec and connecting the velocity regulator 82. In addition, selector 86 is operated connecting the PI bus regulator 80. In the BACKSPIN BUS VOLTAGE REGULATION state 74, the bus voltage Vbus is compared with the setpoint Vreg, which is 540 vdc in the example, via summing block 88 and the PI bus regulator 80. As is stated above, alternatively, when the velocity reaches zero, the controller can command a zero torque, allowing the load torque to reverse rotation until the motor velocity Motor_Vel exceeds the value for Backspin_Rev_Vel, causing the transition to the BACKSPIN BUS VOLTAGE REGULATION state 74 (FIG. 3).

When the bus voltage Vbus subsequently increases to exceed the threshold value, (Vbus>Backspin_Bus_Min), the system transitions from the BACKSPIN BUS VOLTAGE REGULATION state 74 back to the initial RUN state 70.

Test Results

Figure 6:
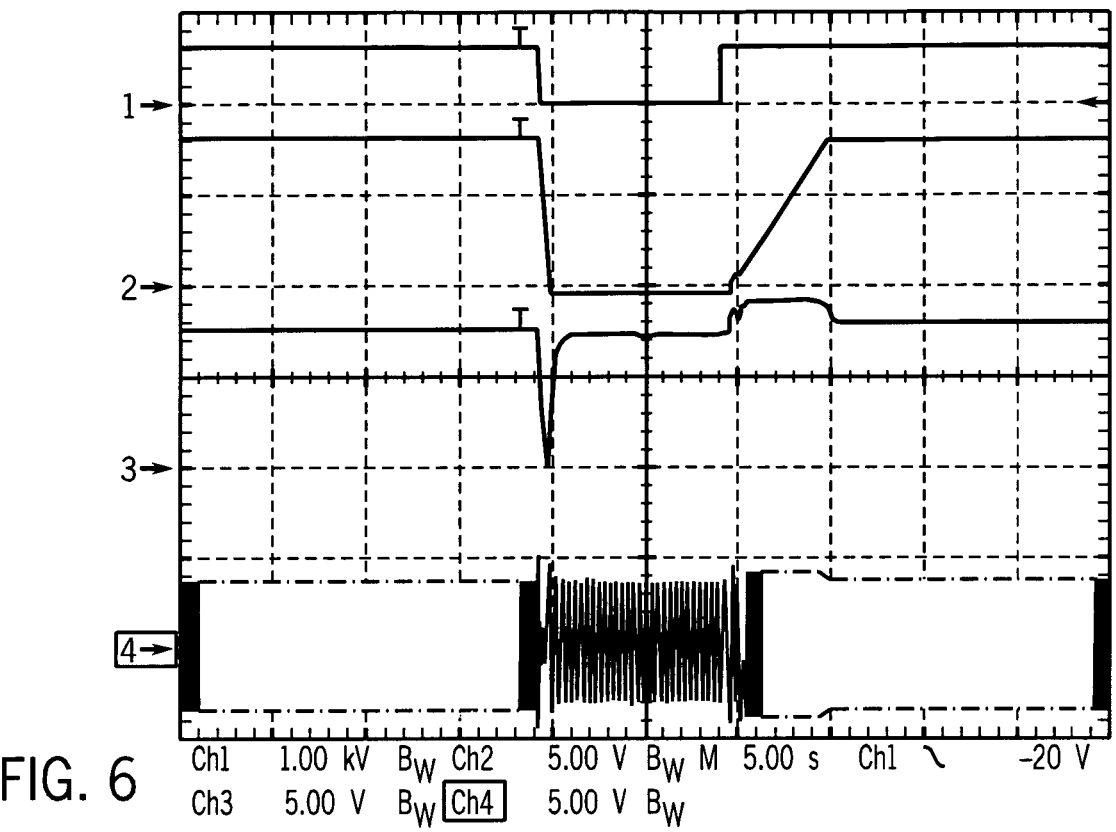
FIGS. 6, 7, 8 and 9 illustrate waveforms obtained by a laboratory dynamometer experiments of the backspin controller for different motor speeds and torques, with FIG. 7 showing results obtained using a backspin controller with a dynamic brake controller in accordance with the invention.
Figure 7:
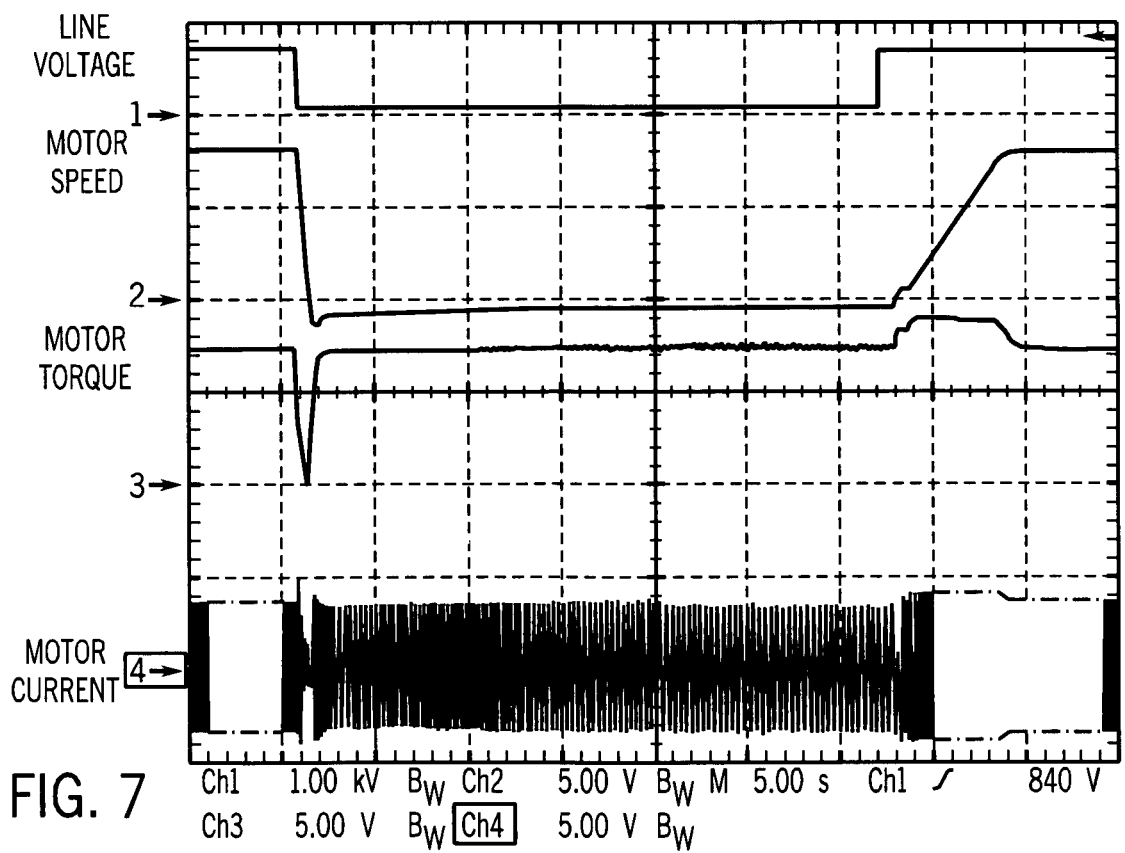
Figure 8:
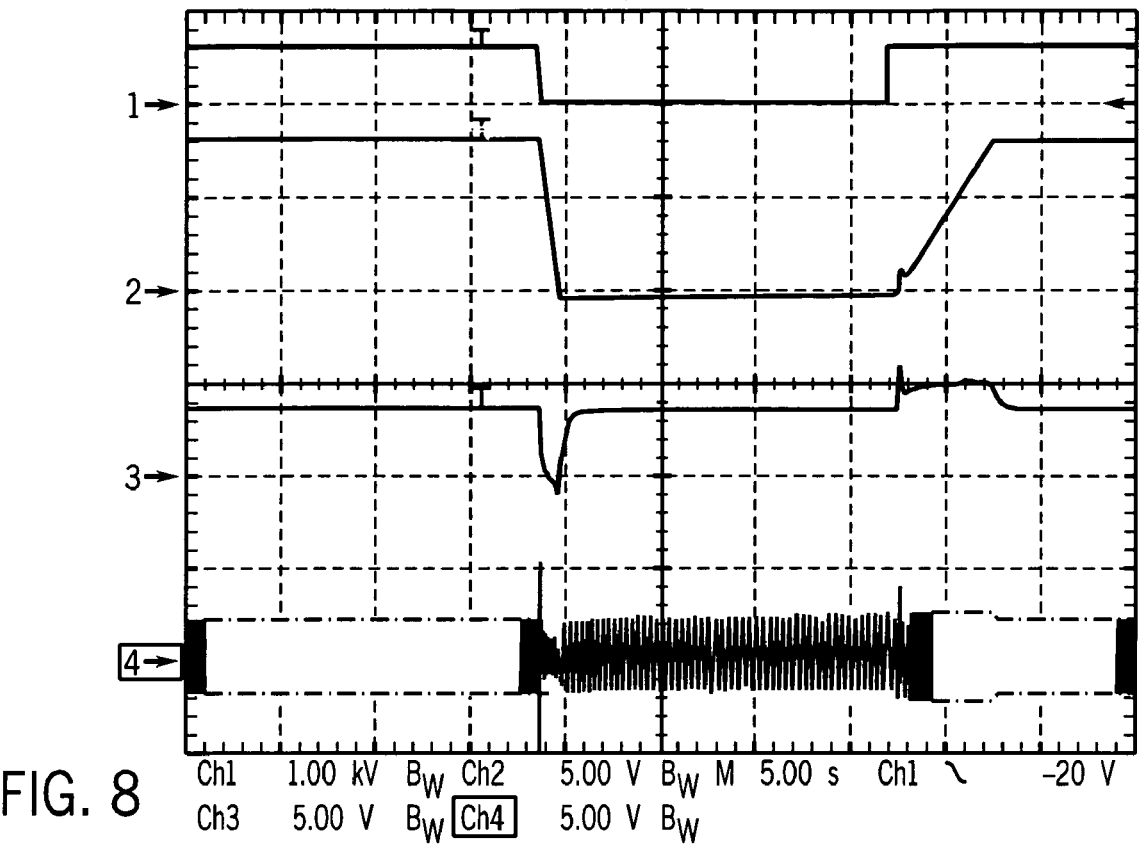
Figure 9:
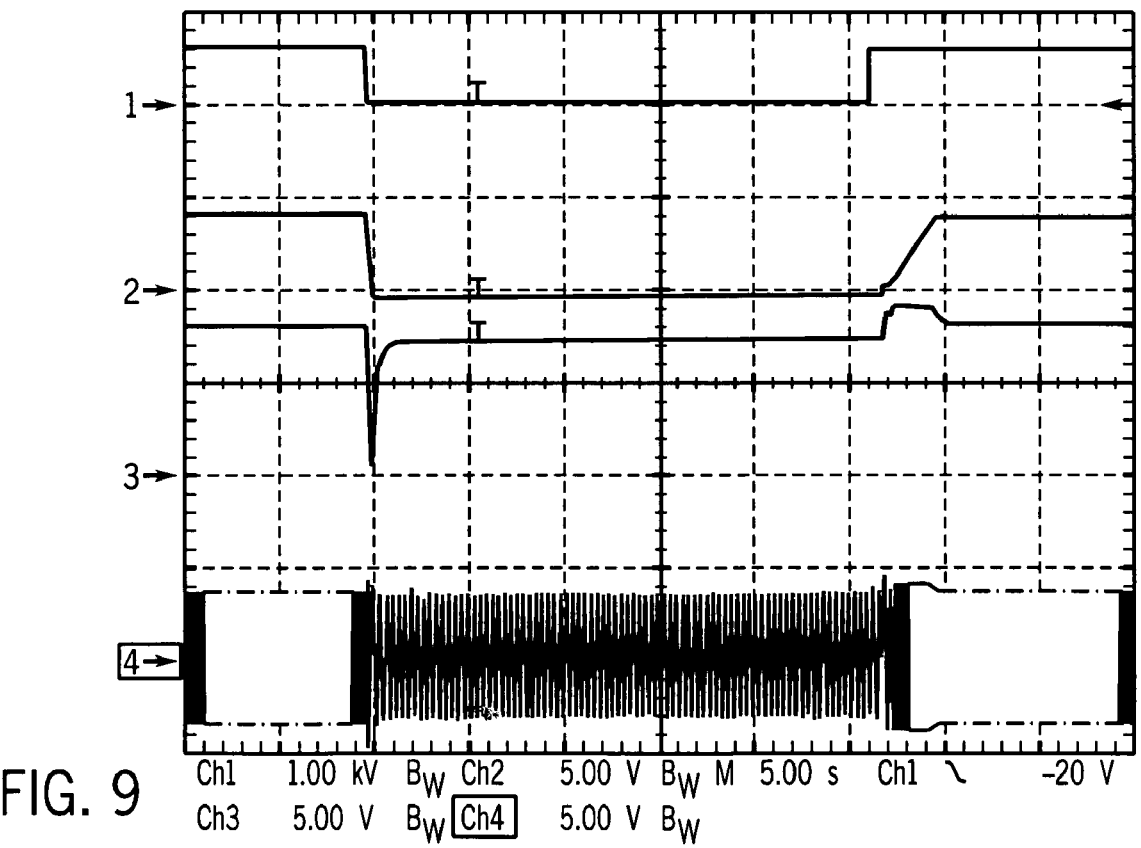

FIGS. 6, 7, 8 and 9 are waveforms obtained by a laboratory dynamometer experiment illustrating the operation of a drive backspin controller 60 for power outages at various operating conditions. FIGS. 6 and 7 illustrate the conditions for a motor operating at 100% speed and 100% torque. The results shown in FIG. 7 were obtained using the dynamic brake controller 57 (FIG. 2) which allows the speed Backspin_Rev_Vel to be set high. FIG. 8 illustrates the condition for a motor operating at 100% speed and 50% torque. FIG. 9 illustrates the condition for a motor operating at 50% speed and 100% torque. In FIGS. 6, 7, 8 and 9, channel 1 is rectified line voltage, where 0.6 divisions equals rated voltage, channel 2 is the motor velocity where 1.6 divisions is equals rated speed, channel 3 is motor torque where 1.6 divisions equals rated torque and channel 4 is motor current where 0.7 division is the peak of the motor rated current. Portions of the motor current would normally appear as a wide black line in FIGS. 6, 7, 8 and 9 (as well as in FIGS. 12-15 and 20-22) because the motor current is alternating. At rated motor electrical speed of 60 cycles per second and a chart speed of 5 seconds per division, the alternations are so close together as to appear as a wide black line. To avoid excessive black, these areas have been whited out, showing only the upper and lower outlines of the waveform. The width between the outlines is proportional to the motor current magnitude.

Power Dip Controller

Figure 11:
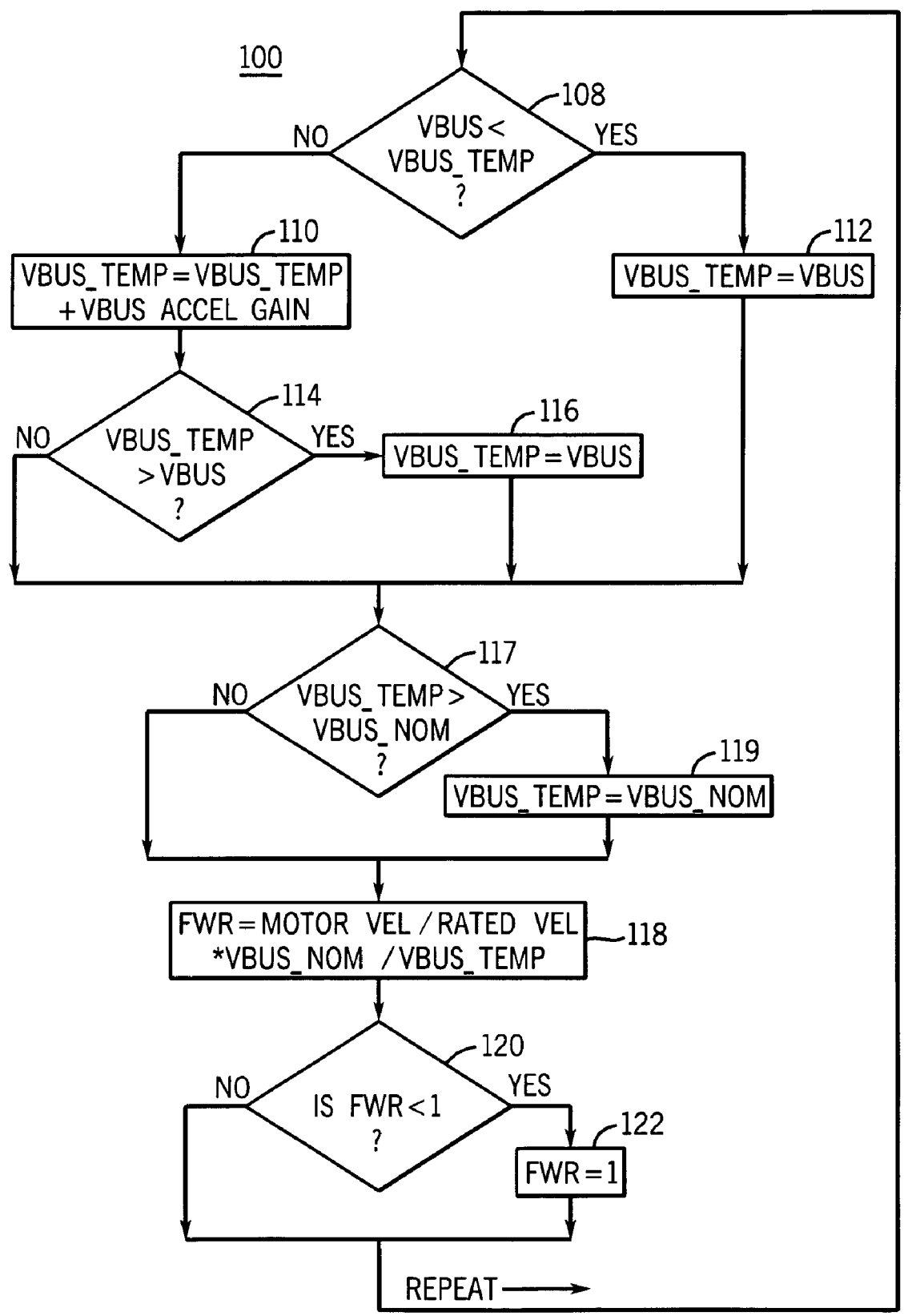
FIG. 11 is a process flow chart for the power dip controller of FIG. 2 provided by the present invention.

Brownout conditions are addressed by a power dip controller provided by the present invention. FIG. 11 is a flow chart of the power dip controller 100 in accordance with the invention.

Normally a pump drive would trip if the line voltage is reduced such that the bus voltage falls below its under voltage trip point. Even before the drive trips the motor 36 (FIG. 2) is being operated with less than the adequate voltage causing a loss of motor power and motor current distortion due to the motor 36 being starved for voltage.

The power dip controller 100 addresses these problems to allow the motor 36 (FIG. 2) to keep running, producing optimum power output under brownout conditions. The power dip controller 100 does this by weakening the motor field current and flux as the bus voltage is reduced during a voltage sag condition. A conventional field weakening controller would weaken the field if rated motor speed is exceeded. In contrast, the power dip controller 100 weakens the field if motor rated speed is exceeded or bus voltage is less than adequate for the speed at which the motor 36 is running.

The power dip controller 100 monitors the bus voltage and the motor speed and calculates a field weakening ratio FWR that is used in reducing the motor field and flux whenever the rated speed is exceeded or the bus voltage becomes less than adequate for the speed at which the motor 36 is running. The motor field current used is determined by dividing the normal motor field current by the FWR factor. Similarly, the requested flux is determined by dividing the normal flux by the FWR factor. Data, such as the current bus voltage, the FWR factor, and other data used in calculations made by the power dip controller 100 can be stored in a data memory of the controller 50 (FIG. 2). The FWR factor is approximately equal to one under normal operating conditions, with bus voltage equal to Vbus Nom. The FWR factor is inversely proportional to the operating voltage, as will be shown, and accordingly the FWR factor will increase in correspondence with a decrease in the operating voltage. The power dip controller 100 is operable to prevent the FWR factor from becoming less than one.

The power dip controller 100 manages motor field current and motor flux by changing the FWR factor. Managing field current indirectly manages motor flux. For more precise control, a flux regulator is also used Normal flux divided by FWR is the setpoint for the flux regulator.

The power dip controller 100 responds to changes in the bus voltage Vbus to adjust the motor speed as shown in FIGS. 12-15. The amount of adjustment made in motor speed is dependent upon the current operating conditions. For example, when the motor is operating at 100% speed and 100% torque, a 50% reduction in line voltage will result in a 50% reduction in motor speed to maintain the necessary torque.

Figure 10:
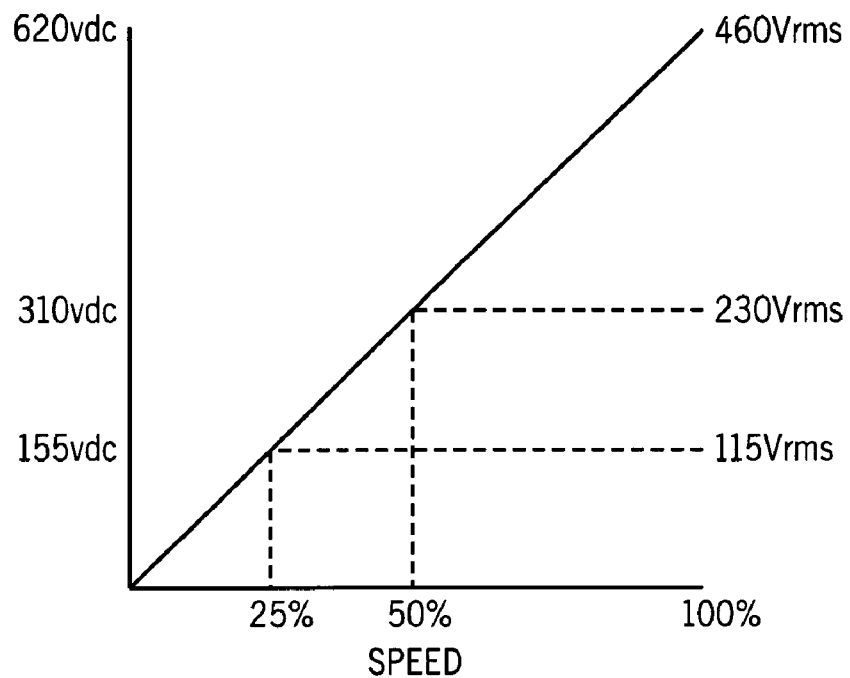
FIG. 10 is a graph of bus voltage (vdc—on the left side and Vrms—corresponding to 3-phase line voltage on the right side) as a function of speed.

This is illustrated FIG. 10, which is a graph of bus voltage (vdc—on the left side and Vrms—corresponding to 3-phase line voltage on the right side) as a function of speed. The relationship between bus voltage and speed is approximately linear. Accordingly, a 50% decrease in the bus voltage will result in approximately a 50% decrease in speed or torque. As shown in FIG. 10, at 100% speed, the bus voltage is 460 Vrms (620 vdc). If the bus voltage drops to 230 Vrms (half the normal value of 460 Vrms) 310 vdc at 100% speed, the power dip controller 100 will regulate the motor speed to 50% of the current motor speed to maintain the 100% maximum torque. Similarly, if the bus voltage drops to 155 vdc, ¼ of the normal value to 115 Vrms at 100% speed, the power dip controller 100 will regulate the motor speed to 25% of the current motor speed to maintain 100% maximum torque. However, when the motor is operating at less than 100% speed (or torque) for example, a lesser or no adjustment may be needed as will be shown.

Referring to the flow chart in FIG. 11, the process begins in decision block 108 which determines if the bus voltage is less than a variable Vbus_Temp. Vbus is the current bus voltage. Vbus_Temp is variable that is stored to be used in a subsequent calculation. Nominal bus voltage is the bus voltage that is expected at rated incoming voltage. For example, for a 460 VAC rated incoming voltage, the nominal bus voltage Vbus_Nom is given by:

$$\text{Vbus\_Nom} = 460 * 1.35 = 621 \text{ vdc}, \quad (1)$$

where 1.35 is the factor for a three-phase full wave rectifier feeding a DC bus through a link choke.

If the bus voltage is not less than Vbus_Temp, flow proceeds to block 110 which sets a variable Vbus_Temp equal to Vbus_Temp+Vbus_Accel_Gain. The value Vbus_Accel_Gain is a gain set that is used to bring down the FWR ratio slowly for smoother response.

From block 110, flow proceeds to decision block 114 which determines whether or not the bus voltage Vbus is less than Vbus_Temp. If the bus voltage is not less than Vbus_Temp, flow proceeds to block 117. If the bus voltage is not greater than Vbus_Temp, flow proceeds to block 116 which sets Vbus_Temp equal to Vbus and flow then proceeds to block 117.

If decision block 108 determines that the bus voltage Vbus is less than Vbus_Temp, flow proceeds to block 112 which sets Vbus_Temp equal to Vbus and flow proceeds to decision block 117.

If decision block 117 determines that Vbus_Temp is greater than Vbus_Nom, then VBus_Temp is set equal to Vbus_Nom, block 119 and flow proceeds to block 118. If decision block 117 determines that Vbus_Temp is not greater than Vbus_Nom, flow proceeds directly to block 118.

Block 118 calculates the current value for the FWR factor. The FWR factor is calculated from the relationship:

$$\text{FWR} = (\text{Motor\_Vel}/\text{Rated\_Vel}) * (\text{Vbus\_Nom}/\text{Vbus\_Temp}) \quad (2)$$

The process flow proceeds to block 120 which determines if the field weakening ratio FWR is less than 1. If the field weakening ratio FWR is not less than 1, flow returns to block 108 and the process repeats. If the field weakening ratio FWR is less than 1, flow proceeds to block 122 which sets FWR equal to 1 before returning to block 108. If FWR is less than 1, then the power dip controller 100 would be trying to strengthen the field, an undesirable condition. By way of example, the process can be repeated at a rate of about 1000 times per second.

The power dip controller 100 assumes that the motor is an AC induction motor. Motor rated velocity is the speed on the motor name plate. This is the speed when rated frequency and voltage is applied to the motor under full load. For a 4-pole motor rated at 60 Hz and 460 volts it would be a number like 1780 rpm. To run above motor rated velocity without extra voltage requires the motor field current and flux to be reduced. To run the motor at motor rated velocity at low bus voltage also requires the motor field current and motor flux to be reduced. This is the control provided by the power dip controller 100.

The flow chart in FIG. 11 shows that the power dip controller 100 increases the field weakening ratio (FWR) instantly in response to a reduction in bus voltage. The FWR ratio is recalculated at a rate of about 1000 times per second. The field weakening ratio FWR is decreased slowly for smooth response when the incoming voltage is restored. If the field weakening ratio FWR is increased the motor field and flux is reduced allowing the motor 36 to run at any speed without being starved for voltage. This allows the motor 36 to maintain speed even under a severely low bus voltage as long as the motor current limit is not reached. If the motor current limit is reached the motor 36 will slow down until the field is strengthened enough so that the torque produced by the motor 36 at motor current limit is equal to the load.

Figure 12:
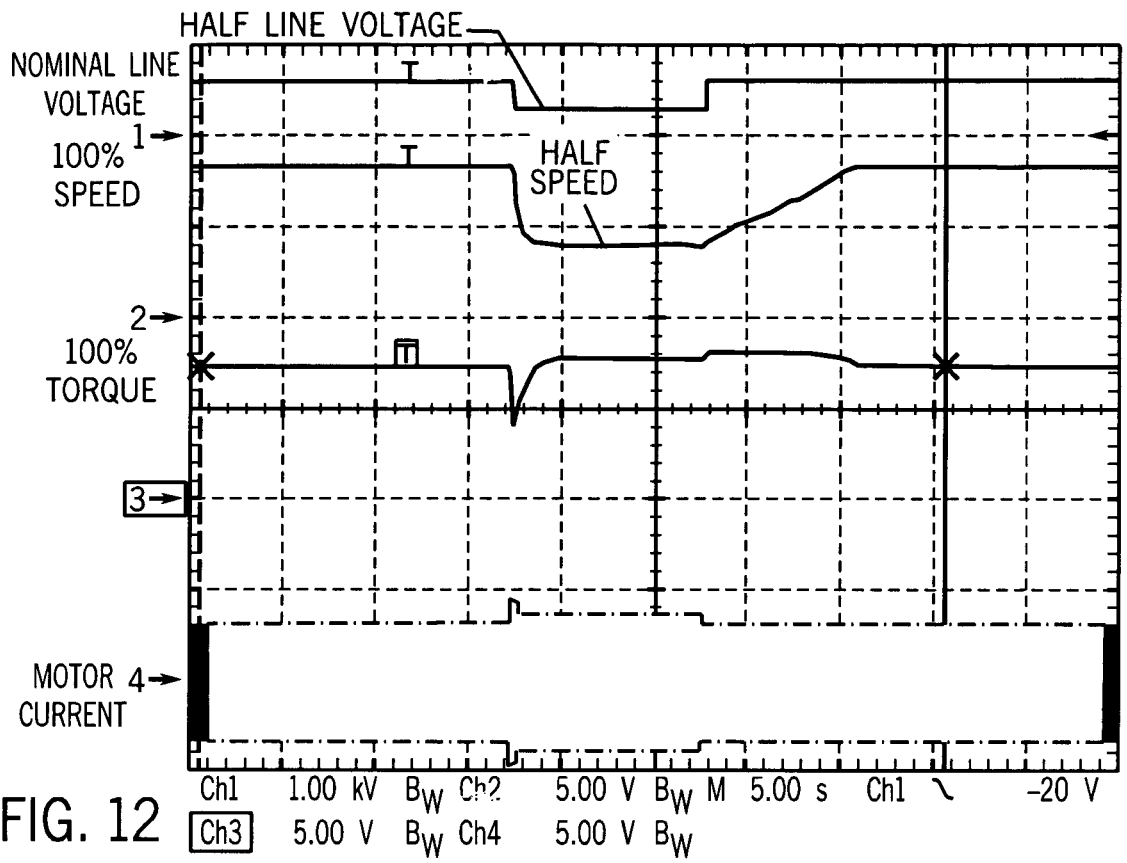
FIG. 12 illustrates waveforms obtained by a laboratory dynamometer experiment of the power dip controller for a progressing cavity pump operating under constant torque conditions.

FIG. 12 illustrates waveforms obtained by a laboratory dynamometer experiment of the power dip controller 100 for a progressing cavity pump operating under constant torque conditions. As shown in FIG. 12, for a 50% brownout condition, indicated in channel 1 of FIG. 12, the motor 36 slows down to 50% speed (channel 2) at 100% torque (channel 3).

The typical normal input voltage operating range of drives is +10% to −10% of rated voltage. However, the drives can actually operate from voltages of 50% to 115% of rated voltage under controlled circumstances. The power dip controller 100 can be used to modulate the PCP operation to achieve maximum possible continuous production for any given voltage within that range. Power dips of up to 50% cause the drive to select an operating point that maximizes pump speed within the torque limit of the system.

For example, a PCP normally running at full speed and 75% torque load will still be able to continue without loss of production for voltage dips down to 75% of drive rated voltage. At a dip of 50% of rated voltage the drive could produce full pump speed at half torque load, half pump speed at full torque load, or any other combination that results in a power draw that is 50% of drive rated power. Transient power outages of fractions of a second will be able to briefly continue full power operation using energy stored in the drive system.

FIGS. 12-17 illustrate waveforms obtained by a laboratory dynamometer experiment of the power dip controller 100 for a progressing cavity pump operating under various speed and torque conditions. FIGS. 12-17 show the operation of the drive power dip controller for a momentary voltage sags of 50% at various pump operating conditions. Channel 1 is rectified line voltage (where 0.6 division equals rated voltage), channel 2 is the motor velocity (where 1.6 division equals rated speed), channel 3 is motor torque where 1.6 divisions equals rated torque, and channel 4 is motor current (where 0.7 division is the peak of motor rated current).

Figure 13:
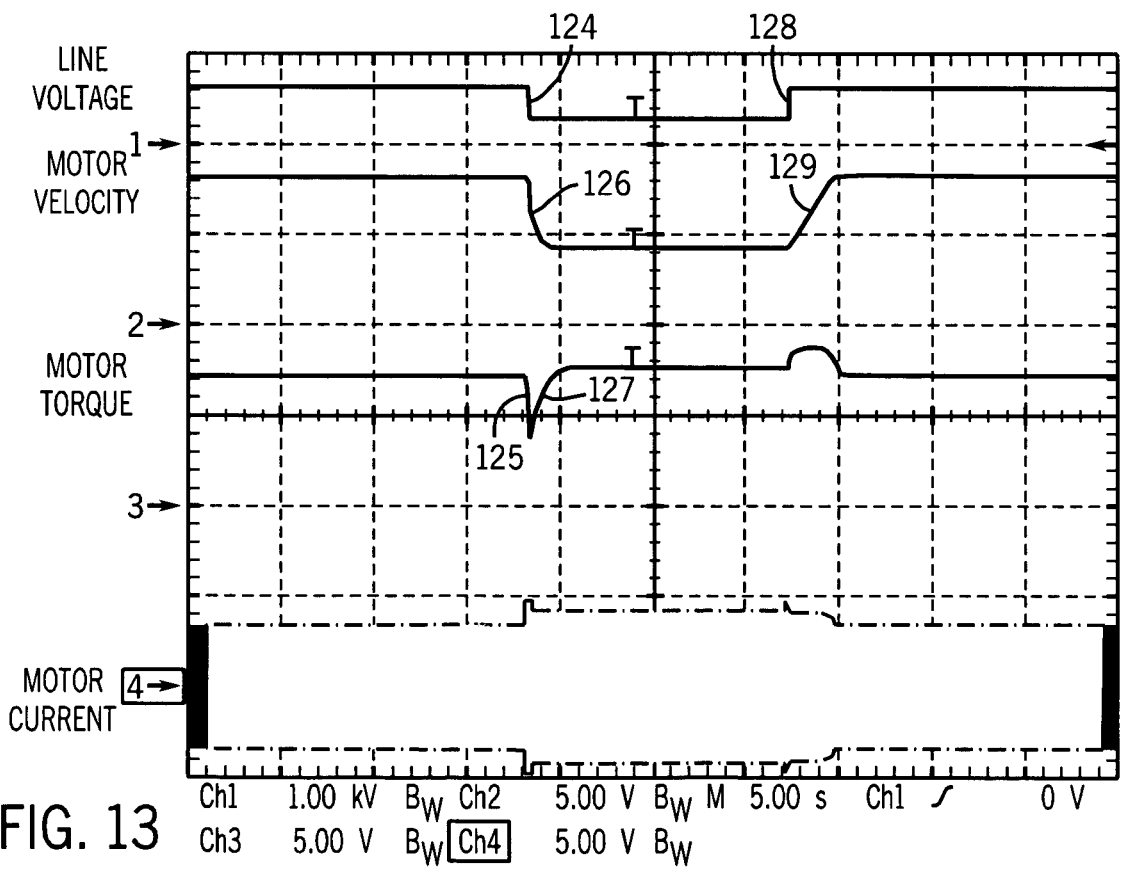
FIGS. 13-15 (and 16 and 17) illustrate waveforms obtained by a laboratory dynamometer experiment of the power dip controller for a progressing cavity pump operating under various speed and torque conditions.

Referring to FIG. 13, there are illustrated the conditions for a motor operating at 100% speed and 100% torque. If the bus voltage is cut in half, the bus voltage Vbus becomes equal to Vbus_Nom/2, as indicated by reference number 124 in FIG. 13. For such condition, the FWR ratio becomes equal to 2. The Vmotor constant (Kv) and the Torque constant (Kt) drop in half.

Accordingly, the drive tries to produce 100% torque which now requires 200% current. The drive limits the current to 100%, cutting the torque to 50%, as indicated by reference number 125 in FIG. 13. Even if the current is not limited to 100%, the torque is reduced since the bus voltage is inadequate. The 50% available torque is less than the load causing the speed to fall. Consequently, the power dip controller 100 decreases the motor speed to 50%, as indicated by reference number 126 in FIG. 13. This allows torque to be increased until it again is at the necessary torque value, as indicated by reference number 127 in FIG. 13. This is an iterative process, adjusting the motor speed to maintain the necessary torque value. When the bus voltage is restored at Vnom, as indicated by reference number 128 in FIG. 13, allowing the speed to be increased, as indicated by reference number 129 in FIG. 13.

Figure 14:
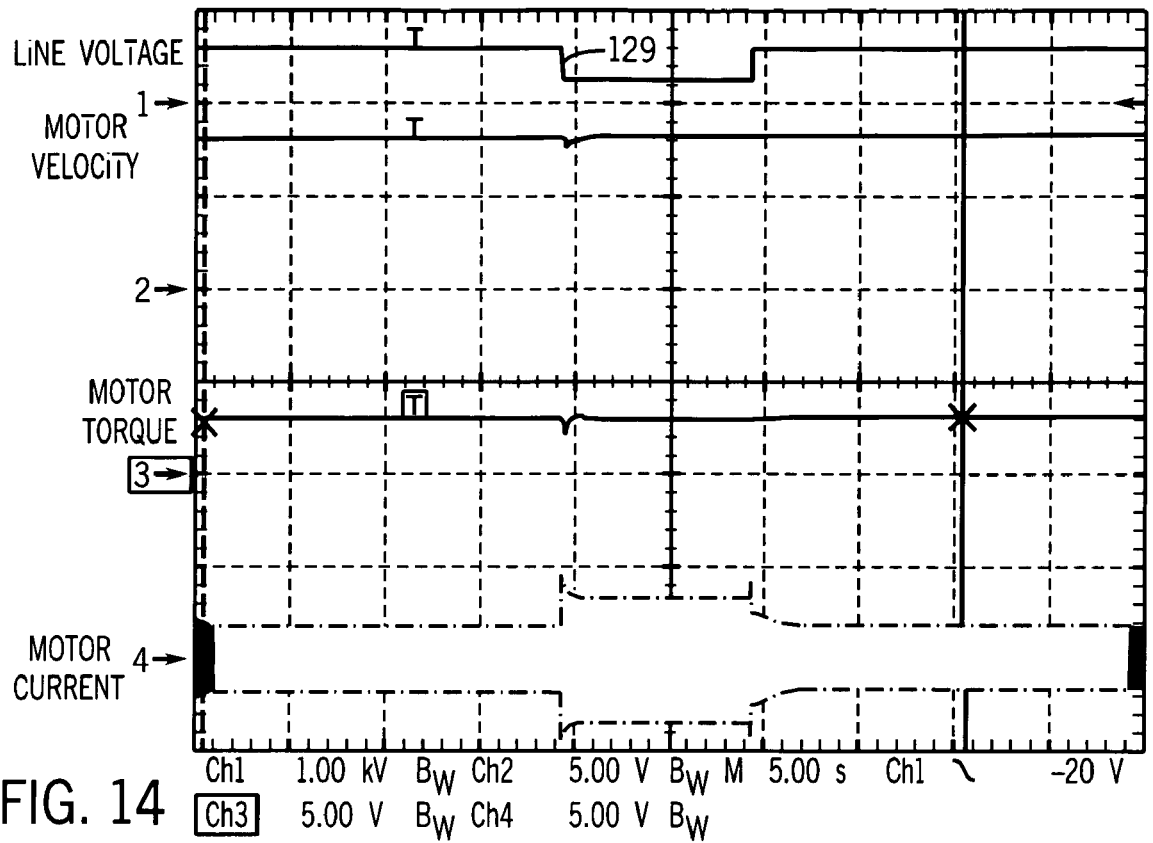
Figure 15:
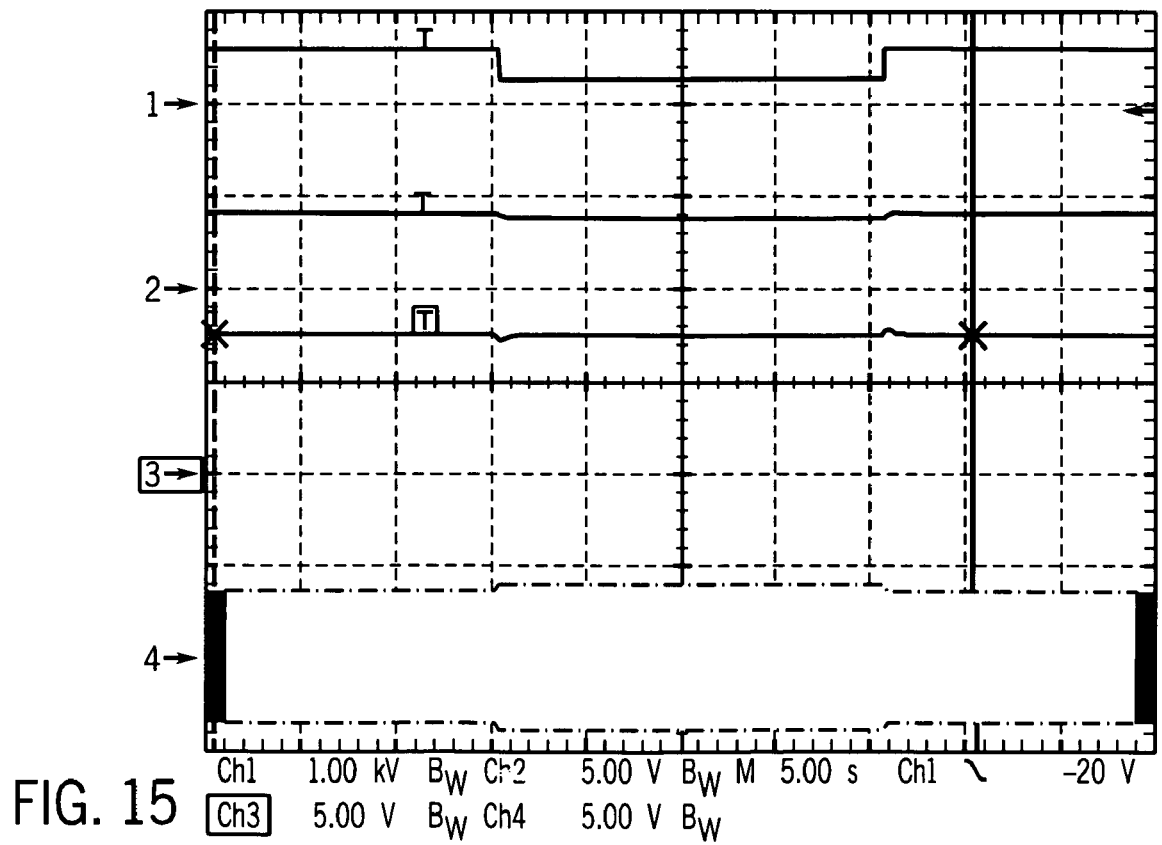
Figure 16:
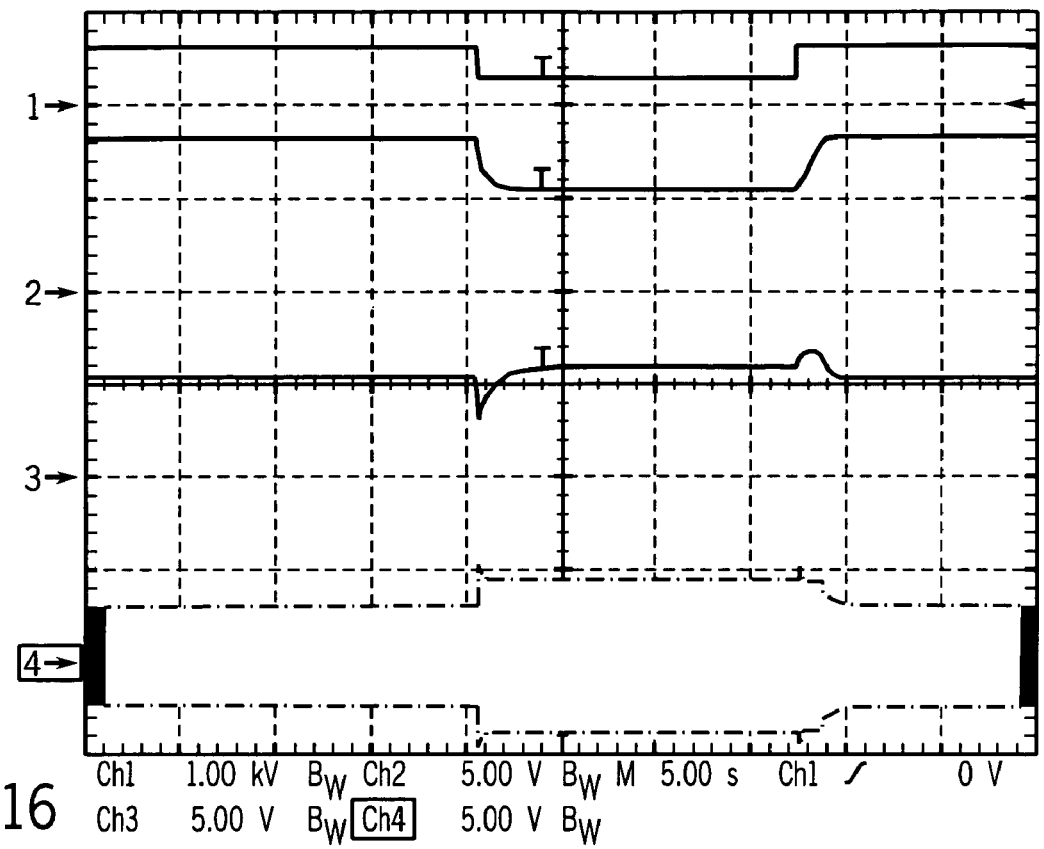
Figure 17:
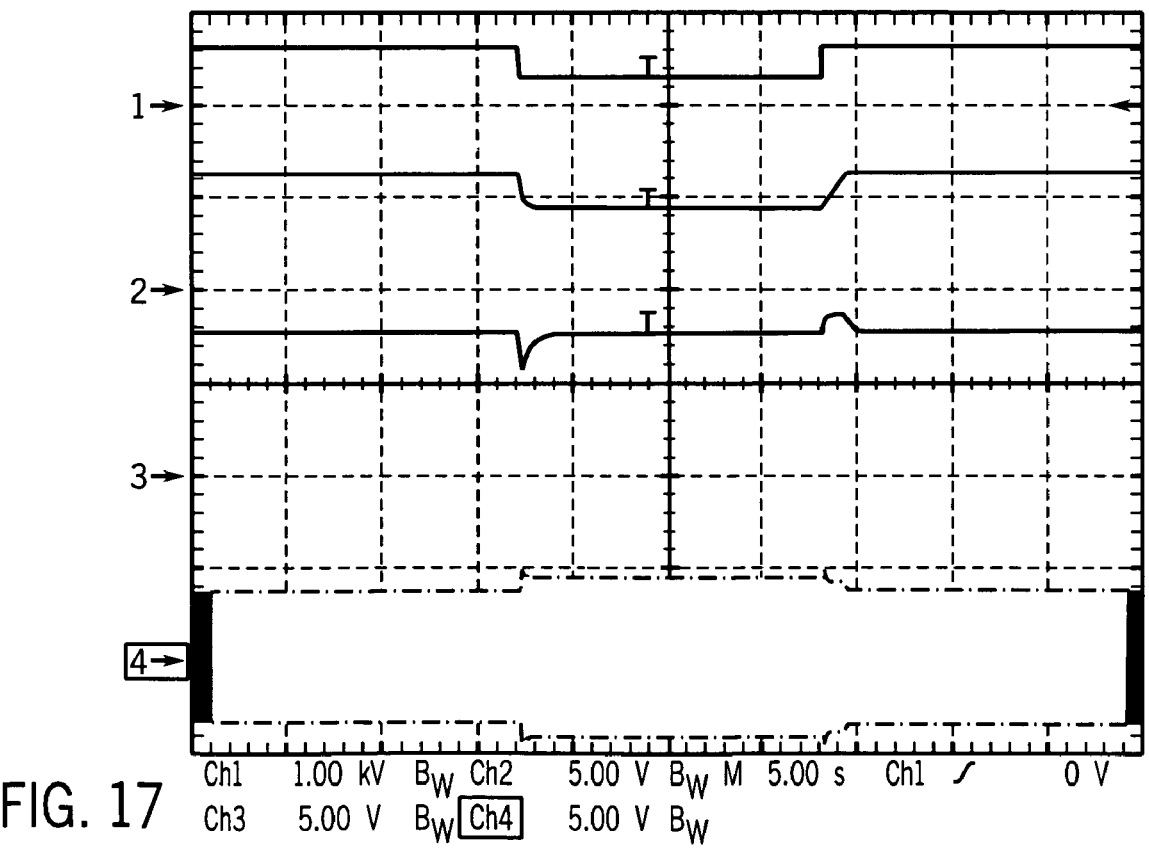

FIG. 14 illustrates the conditions for a motor operating at 100% speed and 50% torque. If the bus voltage is cut in half, the bus voltage Vbus becomes equal to Vbus_Nom/2, as indicated by reference number 129 in FIG. 13. However, aside from a slight disturbance due to the drop in bus voltage, the speed and torque are both are maintained at their respective operating levels. A similar operation results for a motor operating at 50% speed and 100% torque, as shown in FIG. 15. FIG. 16 illustrates the conditions for a 50% decrease in bus voltage for a motor operating at 100% speed and 75% torque. FIG. 16. illustrates the conditions for a 50% decrease in bus voltage for a motor operating at 75% speed and 100% torque. In both cases, the power dip controller 100 maintains the torque at 75%, but the motor speed is decreased by about 25% for the duration of the power disturbance.

Line regenerative drives use an active front end to convert the incoming AC line voltage into a regulated DC bus voltage. This conversion process can be used to boost sagging input voltages to that required to operate the motor at full speed. The power sag capability of line regenerative drives is similar to that of the power dip controller 140 except that operation can be sustained to lower input voltages. The actual power dip that can be tolerated will depend on the required pump power. Partially loaded PCPs could be operated at full speed from very low line voltages provided the input current rating of the drive is not exceeded.

Phase Loss Controller

Figure 19:
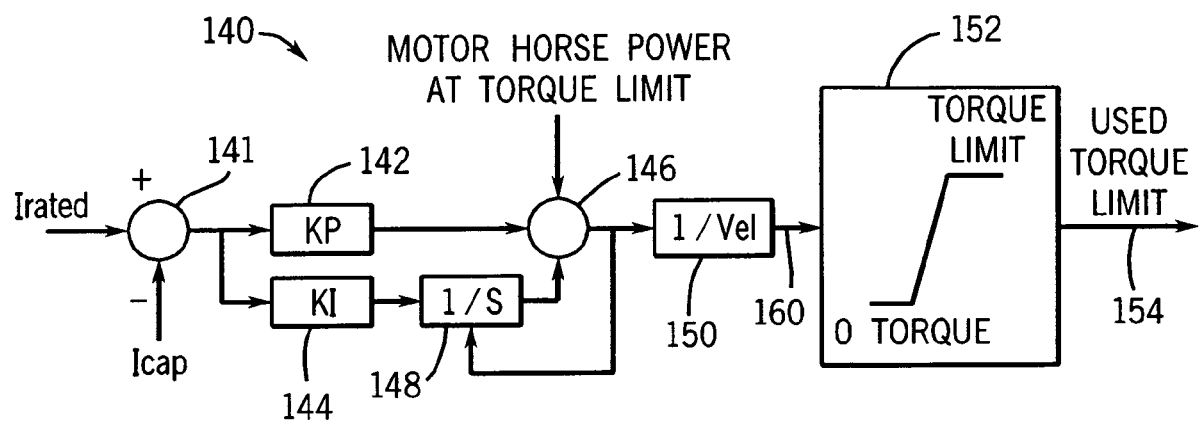
FIG. 19 is a block diagram of the phase loss controller of FIG. 2 provided by the present invention.

Referring to FIGS. 2 and 19, phase loss and voltage imbalance conditions are addressed by the phase loss controller 140 provided by the present invention. A 3-phase power source can become a single phase power source if one of the wires breaks, or if a fuse blows, interrupting one of the 3-phase current paths. This complete loss of a phase can be considered the most extreme type of voltage imbalance. Normally, a pump drive would trip if the incoming three phase voltage is reduced to single phase or there is significant voltage imbalance. For 3-phase balanced supply voltage, bus voltage ripple is relatively low. Bus voltage ripple increases significantly for single phase or imbalanced power as compared with balanced 3-phase power. Single phase or imbalanced incoming power can overload the incoming voltage rectifier bridge 45 (FIG. 2) and subject the bus capacitors 47 to excessive ripple current. In known AC power conversion systems, the drive is disabled to prevent the capacitors or rectifier bridge from failing, resulting in shut down of the drive under phase loss or voltage imbalance conditions. The phase loss controller 140 of the present invention allows the pump 32 to keep running under phase loss and voltage imbalance conditions by reducing the motor power output if required to keep the input rectifier and capacitor ripple currents at or below their rated capacities.

The loss of an incoming phase or significant supply voltage imbalance will normally disable conventional drives. The drives, according to the present invention, have the capability of detecting phase loss or voltage imbalance but continuing operation at reduced capacity. The phase loss controller can be used to modulate the PCP operation to achieve maximum possible production consistent with the drive single phase or voltage imbalance capacity. These types of power disturbance cause the drive to select an operating point that maximizes pump speed within the torque limit of the system.

The phase loss controller 140 monitors bus ripple voltage. This voltage represents an increase in unbalanced rectifier and bus ripple current A ripple voltage of approximately 20% of the nominal DC bus voltage will be the upper limit of what can be tolerated by typical variable speed drive input rectifier and bus capacitors. The general concept of the phase loss controller is to use the magnitude of the bus ripple voltage to reduce the power demand of the drive to an acceptable level.

For example, a PCP normally running at full speed and 40% torque load will still be able to continue without loss of production in spite of the loss of one of its incoming phases. During single phase operation, the drive can produce full pump speed at 40% torque load, 40% pump speed at full torque load, or any other combination that results in a power draw that is 40% of drive rated power. The reduction in drive capacity due to voltage imbalance is proportionate to the magnitude of that imbalance. During a voltage imbalance condition, the drive will automatically adjust to maximize production with the available capacity.

Referring to FIG. 19, the phase loss controller 140 reduces the horsepower output of the drive if drive single phase or voltage imbalance capacity is exceeded, allowing the motor 36 to produce at most the power that results in rated capacities.

The phase loss controller 140 includes a proportional integral function (PI) 142, 144 and 148 that responds to a change in bus ripple current with respect to a setpoint value to adjust the output torque of the drive if rated capacitor bus ripple current is exceeded. The output torque is reduced whenever the capacitor bus ripple current feedback becomes greater than the rated capacitor bus ripple current. The phase loss controller 140 includes the torque output limiter 152, that limits the torque value to upper and lower limits.

Inputs to the phase loss controller 140 include the value of capacitor bus ripple current feedback Icap, the value of motor horsepower at torque limit, the current motor speed Motor_Vel, and a setpoint value for rated capacitor bus ripple current Irated. Motor rated velocity Rated_Vel is the speed when rated frequency and voltage is applied to the motor under full load. By way of example, for a 4-pole 460 volt motor operating at 60 Hz, the speed would be 1780 rpm. Data, such as the value of capacitor bus ripple current, setpoint values, and other data used in calculations made by the bus ripple controller 140 can be stored in the data memory 58 (FIG. 2). The output of the phase loss controller 140 is the value calculated by the phase loss controller 140 for used torque limit. Bus ripple current is obtained by the relationship:

$$Icap = C\frac{[d(Vbus)]}{dt} \qquad (3)$$

where C is the value of the bus capacitors 47 (and capacitors 48).

The capacitor bus ripple current feedback Icap is summed with the setpoint value for rated capacitor bus ripple current Irated in summing block 141. The result is multiplied by a proportional gain factor Kp in block 142 and an integral gain factor Ki in block 144. The output of block 144 is integrated with respect to time by integrator 148. The proportional and integral components obtained are summed with the value of motor horsepower at torque limit in summing block 146. In block 150, the result is divided by the current motor speed, providing the torque output at point 160 which is passed through the torque output limiter 152, that limits the torque value to upper and lower limits, to the output 154 of the bus ripple controller 140.

The torque output limiter 152 limits the output of the bus ripple controller 140 to + torque and 0 limits. If the value at point 160 exceeds the upper or lower torque limits, the output of the bus ripple controller 140 is clipped to the torque limits set by the torque output limiter 152. The integrator 148 is reset if the total horse power at 146 exceeds motor horse power at torque limit*wind up factor (which, by way of example, can have a value of about 1.2) or is less than zero. This prevents the integrator from winding up excessively. The integrator is reset to the value that results in motor horse power at torque limit*wind up factor at 146 or zero depending on which is exceeded. Under normal conditions, the output of the bus ripple controller 140 is torque limit. Whenever the feedback ripple current exceeds the rated capacitor ripple current, the horsepower at summing point 146 is reduced. This lowered horsepower, divided by feedback speed Vel, reduces the value of the torque limit output of the bus ripple controller 140. This, in turn, causes the motor 36 to slow down because the motor output torque now is less than the load torque which is substantially unchanged with speed. As the motor 36 slows down, the used torque limit output of the bus ripple controller 140 increases. The motor speed stabilizes when the used torque limit becomes equal to the load torque and the bus ripple current equals the rated bus ripple current. The motor 36 produces the maximum horsepower without exceeding the bus capacitor ripple current limit. If the bus capacitor ripple current limit is not exceeded, the rectifier bridge 45 (FIG. 2) is protected because the horsepower produced by the motor 36 is substantially reduced.

Figure 18:
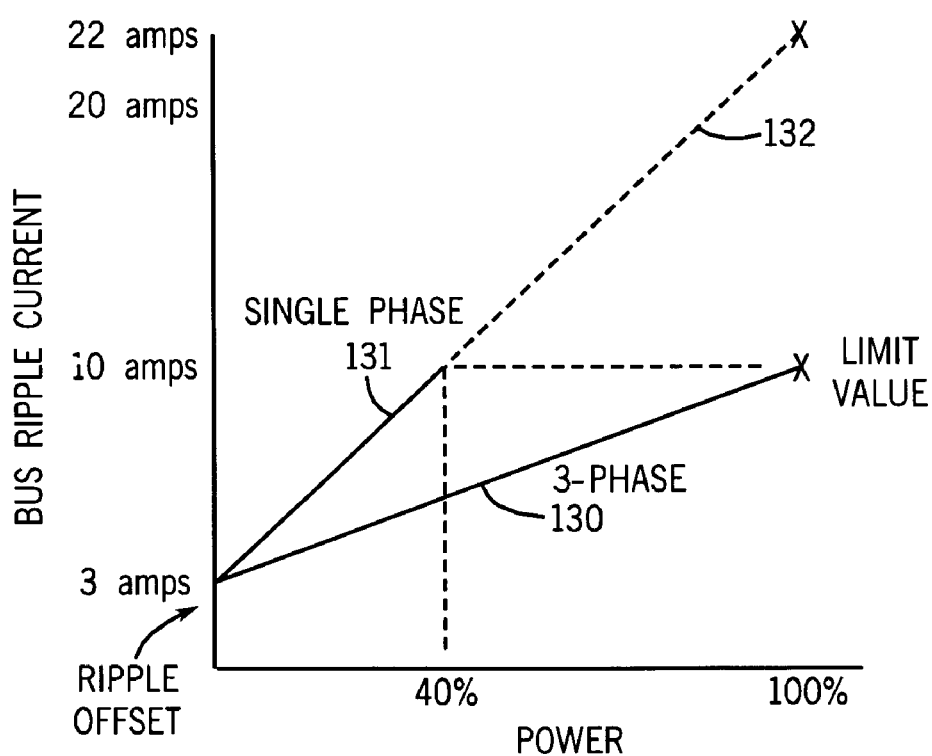
FIG. 18 is a graph of ripple current as a function of % power applied to the motor.

FIG. 18 is a graph of ripple current as a function of % power applied to the motor. The offset ripple current is 3 amps. The drive ripple bus design limit is 10 amps for 100% power. In FIG. 18, normal 3-phase bus ripple current as a function of power is shown by the solid line 130. As shown, the current is 10 amp for 100% power.

In the event of a phase loss, the bus ripple current will increase. In FIG. 18, single phase bus ripple current as a function of power is shown by line 131 which includes a dashed portion 132, representing a potential increase in phase loss ripple current to about 25 amps. However, the phase loss controller 140 regulates to limit current to the design limit of 10 amps. However, this results in a reduction of about 40% in power for a fixed torque, as shown in FIG. 18.

Figure 20:
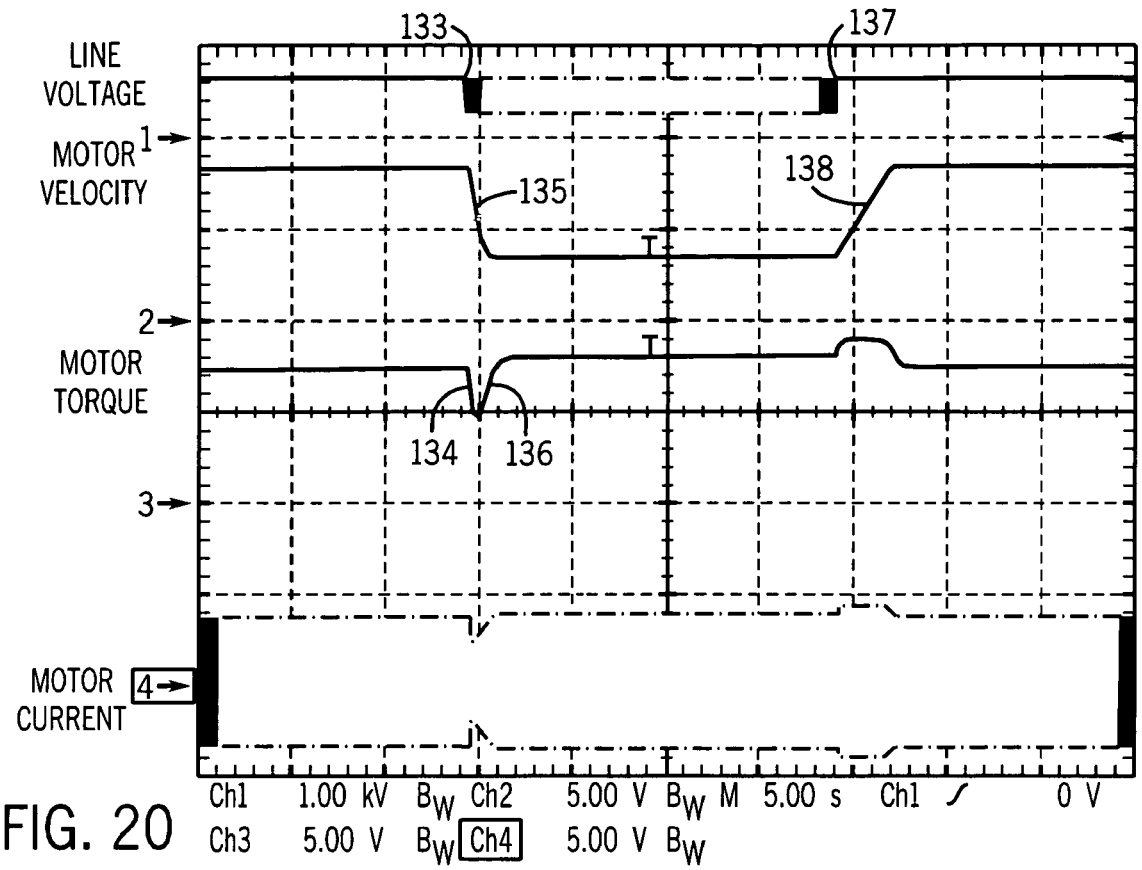
FIGS. 20-22 (and 23 and 24) illustrate waveforms obtained by a laboratory dynamometer experiment of the phase loss controller for a progressing cavity pump operating under various speed and torque conditions.
Figure 21:
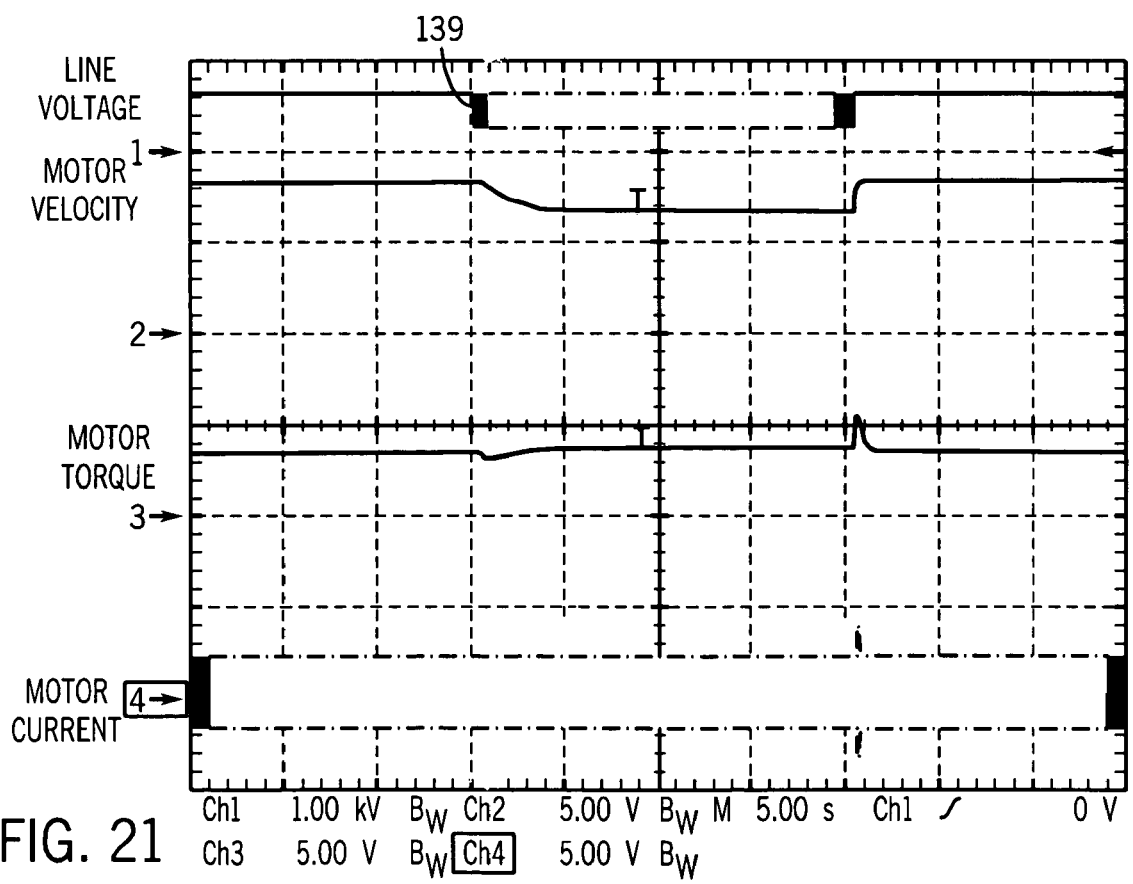
Figure 22:
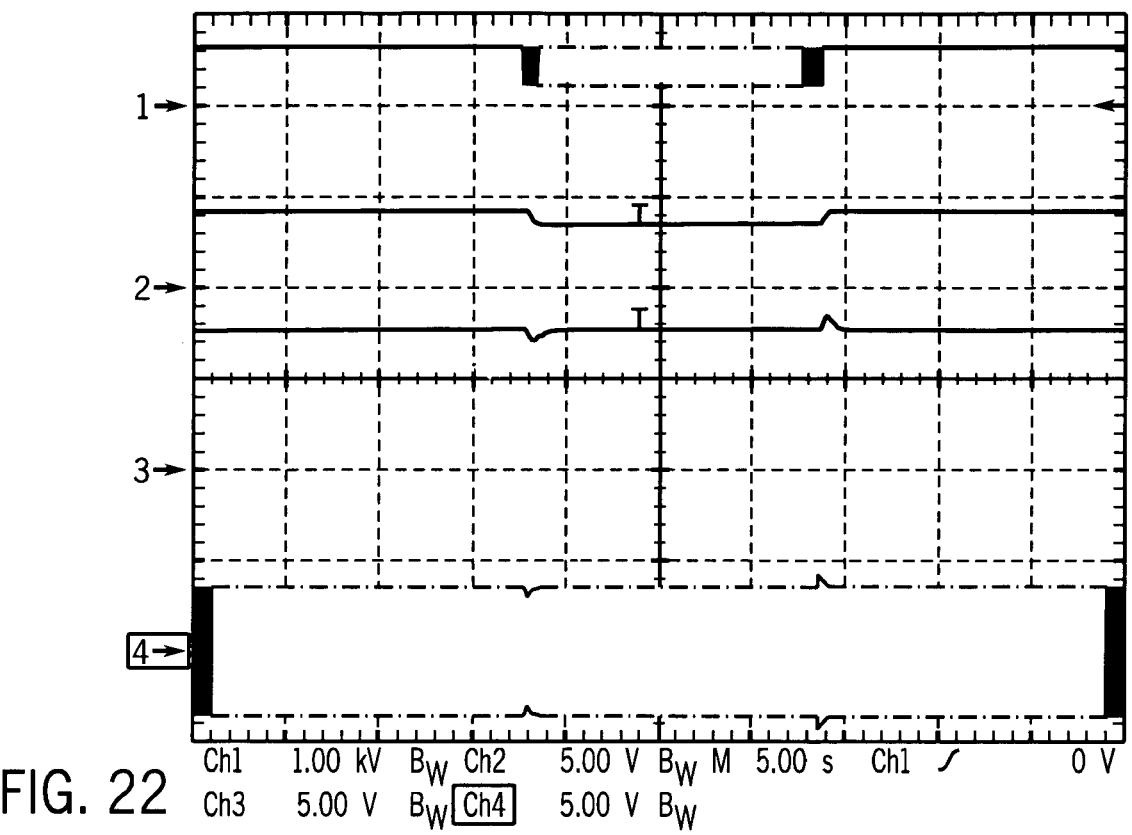

FIGS. 20-24 show the operation of the drive phase loss controller during momentary phase losses at various pump operating conditions. In FIGS. 20-22, channel 1 is rectified line voltage (where 0.6 division equals rated voltage), channel 2 is the motor velocity (where 1.6 division equals rated speed), channel 3 is motor torque (where 1.6 divisions equals rated torque), and channel 4 is motor current (where 0.7 division is the peak of motor rated current).

Channel 1 of FIGS. 20-24 would normally appear as a wide dark line when the drive is running on a single phase. This is because the rectified single phase voltage is now 120 Hertz voltage (instead of 360 Hertz voltage) with lower valleys between the voltage peaks which the oscilloscope follows up and down. To avoid excessive black, these areas have been whited out, showing only the upper and lower outlines of the waveform. The bus voltage (not shown) drops slightly when running single phase and has higher ripple. This results in higher ripple current in the capacitors.

As is stated above, during single phase operation, the drive can produce full pump speed at 40% torque load, 40% pump speed at full torque load, or any other combination that results in a power draw that is 40% of drive rated power. The reduction in drive capacity due to voltage imbalance is proportionate to the magnitude of that imbalance. During a voltage imbalance condition, the drive will automatically adjust to maximize production with the available capacity.

By way of example, FIG. 20 illustrates conditions for a motor operating at 100% speed and 100% torque. If the bus ripple current increases due to a phase imbalance or phase loss condition the motor power is reduced by reducing motor speed. In this example the input voltage switches to single phase at 133 in FIG. 20. This causes the ripple current to exceed the rated ripple current. The ripple current controller therefore reduces the drive horse power at 146 of FIG. 19 to about 40%. This causes the output of the ripple controller to drop to about 40% torque. The 40% available torque is less than the load causing the speed to fall. Consequently, the phase loss controller 140 decreases the motor speed to 40%, as indicated by reference number 135 in FIG. 20. This allows torque to be increased until it again is at the necessary torque value, as indicated by reference number 136 in FIG. 20. This is an iterative process, adjusting motor speed to keep the ripple current at rated and the motor torque equal to the load torque. When the three phase bus voltage is restored, as indicated by reference number 137 in FIG. 20, the ripple current goes down allowing motor speed to go back to 100%, as indicated by reference number 138 in FIG. 20.

FIG. 21 illustrates the conditions for a motor operating at 100% speed and 50% torque. At 139, the 3-phase incoming voltage is reduced to single phase. The ripple controller slows down the drive to about 80% speed to reduce the drive power output from 50% to 40% where the ripple current feedback equals rated.

Figure 23:
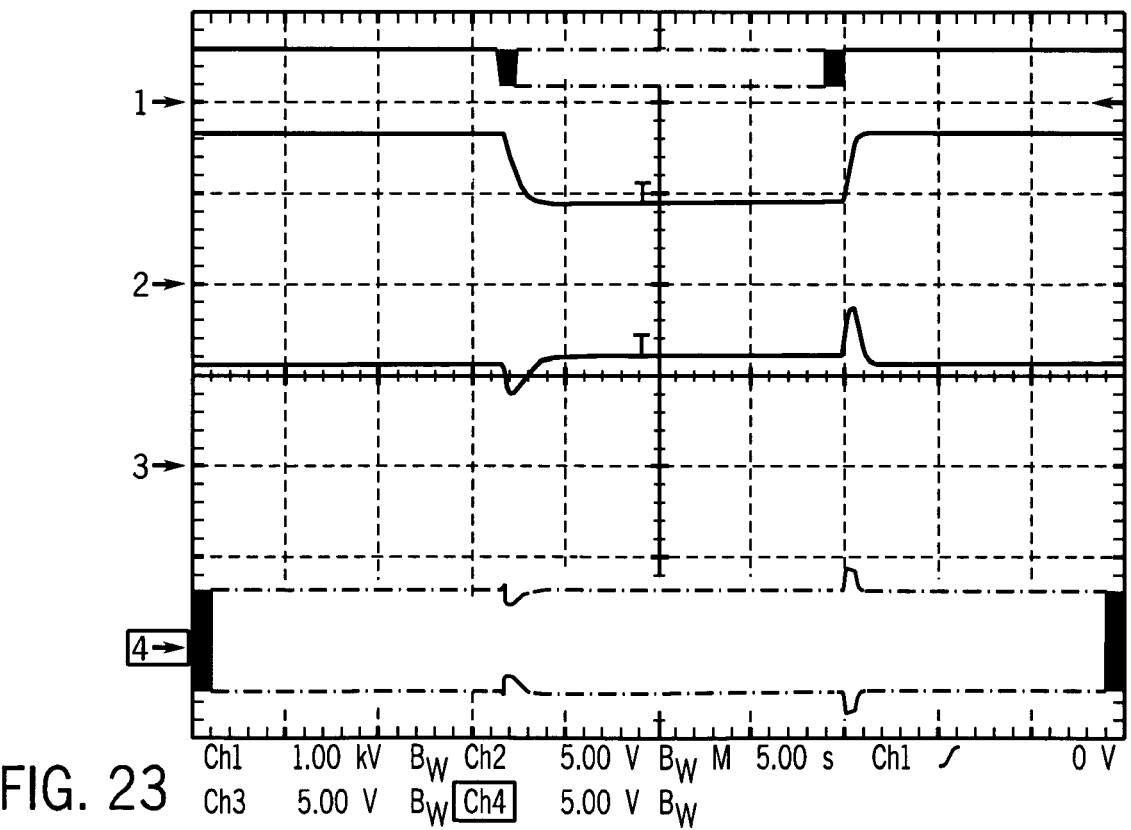
Figure 27:
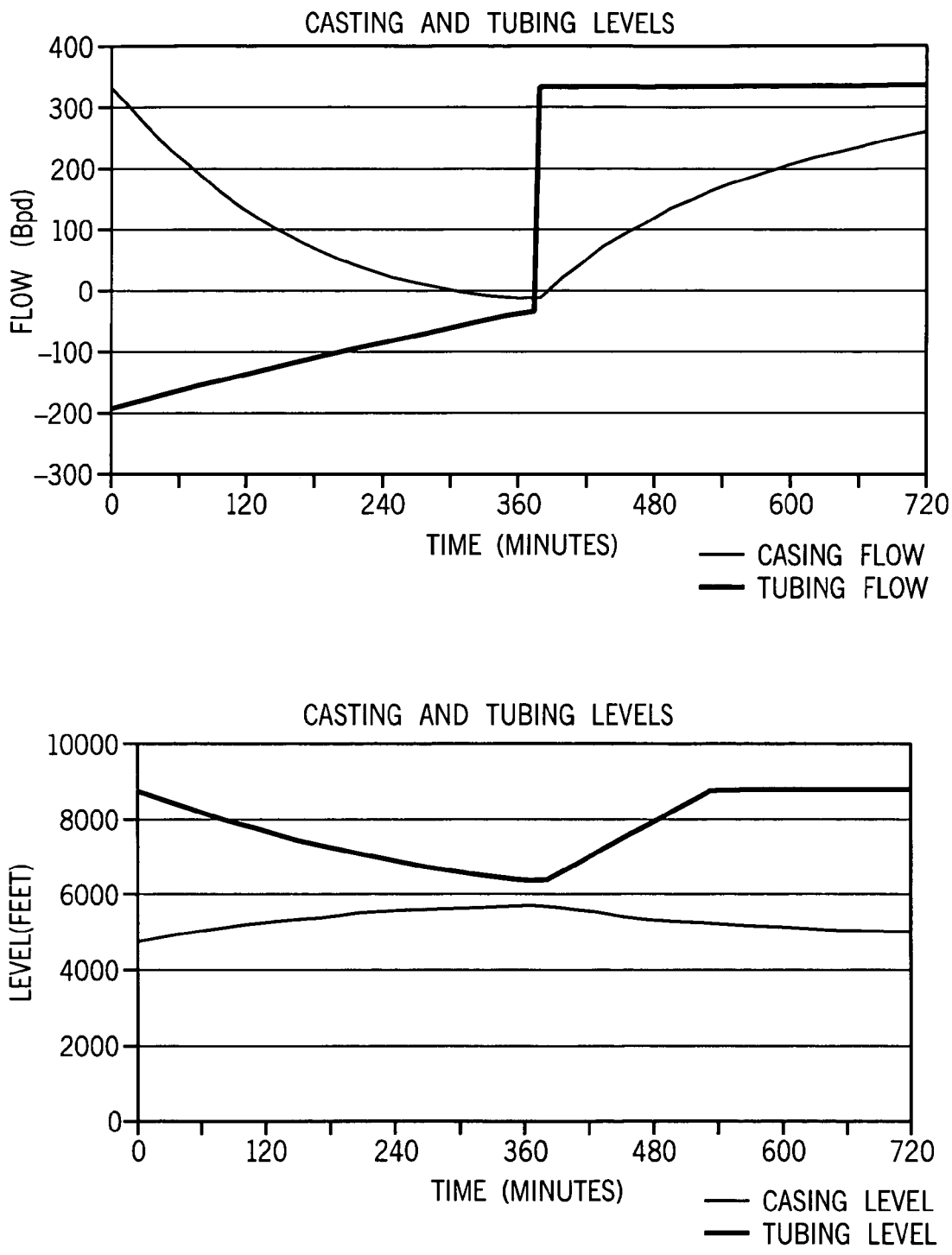
FIG. 27 is a chart illustrating the behavior of casing and tubing flows and levels during a power outage event.

A similar operation results for a motor operating at 50% speed and 100% torque, as shown in FIG. 22. FIG. 23 illustrates the conditions for single phasing for a motor operating at 100% speed and 75% torque, in this case the speed is reduced to 53% to maintain about 40% power. FIG. 24 illustrates the conditions for single phasing for a motor operating at 75% speed and 100% torque, in this case speed is reduced to 40% to maintain about 40% power. In both cases, the power dip controller reduces the power to 40% for the duration of the phase loss.

Several different strategies can be used to limit pump production loss due to power disturbances. FIG. 25 provides a comparison of the production losses for a variety of conditions using the different control strategies. Those strategies can be divided into those that loose and those that maintain control of the PCP during power disturbances. Loss of control of the PCP operation seriously jeopardizes production in wells with long backspin times. Pumps using backspin delay timers can lose substantial production due to power disturbances of even short duration. The use of line regenerative drives or optional capacitor banks allow the PCP to ride through voltage dips of short duration but not for power sags beyond a fraction of a second. The power dip controller maintains PCP operation for voltage sags of up to 50% but not for deeper sags in voltage. The phase loss controller can continue production indefinitely at reduced capacity during the loss in an incoming voltage phase or significant imbalance in the voltage source. The loss of phase or voltage imbalance will cause an alert that can be used to initiate an investigation into the cause of the power supply problem. By using the energy stored in the fluid column to maintain pump operation, the backspin controller eliminates virtually all lost production for power outages of even extended duration. The backspin controller 60 eliminates virtually all lost production of power outage of any duration short of an extended blackout.

It may therefore be appreciated from the above detailed description of the preferred embodiment of the present invention that it provides a system and method for driving a progressing cavity or electrical submersible pump that maintains the pump operating during power disturbances by using the regenerated energy supplied by the fluid load on the pump or by modulating pump operation to match available power capacity. For blackout conditions, the system and method detect power loss and maintain the pump motor 36 running by using the regenerated energy produced as the result of the fluid load on the pump. When operating in a regenerative mode, the backspin controller 60 uses stored energy from the system to maintain internal control voltage on the system during the power failure. The drive 37 is kept energized by controlling the motor 37 to be in a power regenerative condition, using the potential and kinetic energy of the fluid column above the pump as the energy source. For brownout conditions, the power dip controller 100 provides controlled operation of the motor, weakening the motor field current and flux as the bus voltage decreases during the brownout condition. For phase loss or voltage imbalance conditions, the phase loss controller 140 provides controlled operation of the motor, reducing power output to maintain bus capacitor ripple current at or below the capacitor's rated ripple current.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method for controlling the operation of a pump for optimizing pump efficiency and productivity under electrical power disturbance conditions, wherein the pump is driven by an AC electrical motor having a rated operating speed and a motor drive energized by a voltage derived from a bus voltage resulting in a motor flux and field current and a present operating speed of the motor; said method comprising the steps of:

detecting the occurrence of an electrical power disturbance;

determining when the electrical power disturbance is a power dip condition; and using a power dip controller to provide controlled operation of the motor when the electrical power disturbance condition is determined to be a power dip condition, by adjusting motor field current and motor flux as the bus voltage fluctuates during the power dip condition;

wherein the step of using the power dip controller includes the steps of monitoring the bus voltage and present operating speed of the motor, continually calculating a value for a field weakening ratio, and managing the motor field current and motor flux in correspondence with the value of the field weakening ratio.

2. The method of claim 1, wherein, the power dip controller increases the field weakening ratio substantially instantly in response to a reduction in bus voltage, and slowly decreases the field weakening ratio over a period of time when bus voltage is restored after the power dip condition.

3. The method according to claim 1, wherein the step of using the power dip controller includes the steps of monitoring the bus voltage and present operating speed of the motor, calculating a value for a field weakening ratio, and using the field weakening ratio to reduce motor field current and motor flux to reduced values whenever rated motor speed is exceeded or the bus voltage becomes less than adequate for the speed at which the motor is running.

4. The method of claim 3, wherein, the field weakening ratio includes the terms: [(present operating speed of the motor/rated operating speed of the motor)*(rated bus voltage/present bus voltage)].

5. The method of claim 4, further comprising, reducing the motor flux and current only when the field weakening ratio is greater than 1 (one).

6. The method according to claim1, wherein the step of determining the reduced value of motor field current includes the step of obtaining the quotient of a value of normal motor field current and the value of the field weakening ratio, and wherein the step of determining the reduced value of motor flux includes the step of obtaining the quotient of a value of normal motor flux and the value of the field weakening ratio.

7. The method according to claim 6, further comprising, calculating the field weakening ratio in such a manner that the value of the field weakening ratio is inversely proportional to the amplitude of the bus voltage.

8. A method for controlling the operation of a pump for optimizing pump efficiency and productivity under electrical power disturbance conditions, wherein the pump is driven by an AC electrical motor having a rated operating speed and a motor drive energized by a voltage derived from a bus voltage having an amplitude, a present bus voltage and a rated bus voltage, the motor drive resulting in a motor flux and field current and a present operating speed of the motor, said method comprising the steps of:

monitoring the present bus voltage;

detecting the occurrence of an electrical power disturbance by determining when the amplitude of the bus voltage decreases below a predetermined value, indicative of a voltage sag condition; and providing controlled operation of the motor under a voltage sag condition by adjusting motor field current and motor flux as the present bus voltage fluctuates during the voltage sag condition;

wherein the step of providing controlled operation of the motor includes the steps of using a power dip controller to continually calculate a value for a field weakening ratio, and managing the motor correspondence with changes in the field weakening ratio.

9. The method of claim 8, wherein, the power dip controller increases the field weakening ratio substantially instantly in response to a reduction in bus voltage, and slowly decreases the field weakening ratio over a period of time when bus voltage is restored after the power dip condition.

10. The method according to claim 8, wherein the step of providing controlled operation of the motor includes the steps of using the power dip controller to calculate a value for a field weakening ratio, and using the field weakening ratio to reduce motor field current and motor flux to reduced values whenever the rated motor speed is exceeded or the bus voltage becomes less than adequate for the speed at which the motor is running.

11. The method of claim 10, wherein, the field weakening ratio includes the terms: [(present operating speed of the motor/rated operating speed of the motor)*(rated bus voltage/present bus voltage)], and the method further comprises monitoring the present operating speed of the motor.

12. The method of claim 11, further comprising, reducing the motor flux and current only when the field weakening ratio is greater than 1 (one).

13. The method according to claim 10, wherein the step of determining the reduced value of motor field current includes the step of obtaining the quotient of a value of normal motor field current and the value of the field weakening ratio, and wherein the step of determining the reduced value of motor flux includes the step of obtaining the quotient of a value of normal motor flux and the value of the field weakening ratio.

14. The method according to claim 10, further comprising, calculating the field weakening ratio in such a manner that the value of the field weakening ratio is inversely proportional to the amplitude of the bus voltage.

15. A system for controlling the operation of a pump for optimizing pump efficiency and productivity under electrical power disturbance conditions, wherein the pump is driven by an AC electrical motor having a rated operating speed and a motor drive energized by a voltage derived from a bus voltage having an amplitude, a present bus voltage and a rated bus voltage, the motor drive resulting in a motor flux and field current and a present operating speed of the motor, said system comprising:

a voltage monitor for providing an output signal indicative of the amplitude of the present bus voltage;

a plurality of parameter monitors for providing outputs indicative of at least the present operating speed of the motor; and a power dip controller for detecting a power dip condition and to provide controlled operation of the pump motor during the power dip condition by reducing the motor field current and motor flux to reduced values for the motor as the bus voltage decreases during the power dip condition;

wherein the power dip controller responds to the output signal provided by the voltage monitor and an output signal derived from outputs provided by the parameter monitors and indicative of speed of the motor to calculate a value for a field weakening ratio for use in reducing the motor field current and motor flux in correspondence with the field weakening ratio whenever rated motor speed is exceeded or the bus voltage becomes less than adequate for the speed at which the motor is running.

16. The system of claim 15, wherein, the power dip controller increases the field weakening ratio substantially instantly in response to a reduction in bus voltage, and slowly decreases the field weakening ratio over a period of time when bus voltage is restored after the power dip condition.

17. The method of claim 16, wherein, the field weakening ratio includes the terms: [(present operating speed of the motor/rated operating speed of the motor)*(rated bus voltage/present bus voltage)].

18. The system of claim 17, wherein, the power dip controller reduces the motor flux and current only when the field weakening ratio is greater that 1 (one).

19. The system according to claim 15, wherein the power dip controller establishes a reduced value for the motor field current by obtaining the quotient of the value of normal motor field current and the value of the field weakening ratio, and the power dip controller establishes a reduced value for motor flux by obtaining the quotient of the normal motor flux and the value of the field weakening ratio.

* * * * *

UNITED STATES PATENT AND TRADEMARK OFFICE
CERTIFICATE OF CORRECTION

PATENT NO. : 7,534,096 B2
APPLICATION NO. : 11/155372
DATED : May 19, 2009
INVENTOR(S) : Harry W. Schulz Page 1 of 1

It is certified that error appears in the above-identified patent and that said Letters Patent is hereby corrected as shown below:

In claim 6, column 20, line 48, a space should be inserted after the word "claim".

In claim 8, column 21, line 13, words --field current and motor flux in-- should be inserted after the word "motor".

Signed and Sealed this

Eleventh Day of August, 2009

David J. Kappos
*Director of the United States Patent and Trademark Office*